(12) United States Patent
Certain et al.

(10) Patent No.: US 11,314,717 B1
(45) Date of Patent: Apr. 26, 2022

(54) SCALABLE ARCHITECTURE FOR PROPAGATING UPDATES TO REPLICATED DATA

(71) Applicant: Amazon Technologies, Inc., Seattle, WA (US)

(72) Inventors: Tate Andrew Certain, Seattle, WA (US); Anshul Gupta, Seattle, WA (US); Vaibhav Jain, Seattle, WA (US); Sharatkumar Nagesh Kuppahally, Bellevue, WA (US); Alexander Richard Keyes, Seattle, WA (US); Rajaprabhu Thiruchi Loganathan, Issaquah, WA (US); Ravi Math, Redmond, WA (US); Adam Douglas Morley, Seattle, WA (US); Lokendra Singh Panwar, Seattle, WA (US); Krishnan Seshadrinathan, New Castle, WA (US); James Christopher Sorenson, III, Seattle, WA (US); Stefano Stefani, Issaquah, WA (US); Wei Xiao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 15/632,266

(22) Filed: Jun. 23, 2017

(51) Int. Cl.
 *G06F 16/23* (2019.01)
 *G06F 16/27* (2019.01)

(52) U.S. Cl.
 CPC ...... *G06F 16/2329* (2019.01); *G06F 16/2308* (2019.01); *G06F 16/2379* (2019.01); *G06F 16/27* (2019.01); *G06F 16/273* (2019.01); *G06F 2201/82* (2013.01)

(58) Field of Classification Search
 CPC .. G06F 16/273; G06F 16/278; G06F 16/2315; G06F 16/2358
 See application file for complete search history.

(56) References Cited

U.S. PATENT DOCUMENTS

| | | | |
|---|---|---|---|
| 5,799,305 A * | 8/1998 | Bortvedt | G06F 9/466 |
| 5,806,075 A | 9/1998 | Jain et al. | |
| 6,226,650 B1 | 5/2001 | Mahajan et al. | |

(Continued)

OTHER PUBLICATIONS

U.S. Appl. No. 15/625,976, filed Jun. 16, 2017, Skarathumar Nagesh Kuppahally et al.

*Primary Examiner* — Marc S Somers
(74) *Attorney, Agent, or Firm* — Robert C. Kowert; Kowert, Hood, Munyon, Rankin & Goetzel, P.C.

(57) ABSTRACT

Scalable architecture for propagating updates may be implemented for data replicated from a data set. A node may receive updates to items in a data set that have been committed to the data set. The node may determine whether the update should be applied to a replicated portion of the data set. For updates that should be applied, the node may identify another node that hosts the replicated portion of the data set and send a request to the other node to perform a conditional atomic operation to apply the update to the item in the replicated portion of the data set. The condition may compare a version identifier associated with an update and a current version identifier for the item at the other node. If the condition evaluates true, then the update to the item in the replicated portion may be performed.

20 Claims, 14 Drawing Sheets

(56) References Cited

U.S. PATENT DOCUMENTS

| | | | |
|---|---|---|---|
| 7,269,648 B1* | 9/2007 | Krishnan | G06F 16/27 709/224 |
| 7,356,550 B1 | 4/2008 | Lin et al. | |
| 7,657,574 B2 | 2/2010 | Gupta et al. | |
| 8,335,776 B2 | 12/2012 | Gokhale | |
| 8,392,482 B1* | 3/2013 | McAlister | G06F 16/1727 707/899 |
| 8,554,724 B2 | 10/2013 | Zunger | |
| 8,639,786 B2 | 1/2014 | Little | |
| 9,218,383 B2 | 12/2015 | Tan et al. | |
| 9,235,609 B1 | 1/2016 | Pandey et al. | |
| 9,418,130 B2 | 8/2016 | Leshchiner et al. | |
| 9,703,814 B1 | 7/2017 | Shams et al. | |
| 2005/0015436 A1* | 1/2005 | Singh | G06F 16/27 709/203 |
| 2005/0033777 A1 | 2/2005 | Moraes et al. | |
| 2005/0193024 A1* | 9/2005 | Beyer | G06F 16/273 |
| 2005/0240531 A1 | 10/2005 | Wolff | |
| 2006/0271510 A1 | 11/2006 | Haward et al. | |
| 2010/0318795 A1 | 12/2010 | Haddad et al. | |
| 2012/0096046 A1 | 4/2012 | Kucera | |
| 2012/0310878 A1 | 12/2012 | Vuksan et al. | |
| 2013/0238556 A1 | 9/2013 | Mielenhausen | |
| 2014/0258226 A1 | 9/2014 | Noteboom | |
| 2015/0268890 A1* | 9/2015 | Stefani | G06F 16/278 711/162 |
| 2016/0132581 A1 | 5/2016 | Hsieh et al. | |
| 2017/0177700 A1* | 6/2017 | Bensberg | G06F 16/278 |

* cited by examiner

SCALABLE ARCHITECTURE FOR PROPAGATING UPDATES TO REPLICATED DATA

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. Replicating different portions of the partitioned data can further increase the complexity and costs of propagating changes to the data to other data replicas. For example, projections or views of a partitioned database table may be separately maintained. Propagating changes to the projection or views may increase the costs of processing updates at the original partitions of the database table as the original partitions of the database table may need to ensure that the appropriate projections or views of the database table are updated. Techniques that can provide scalable mechanisms for replicating updates to replicated data are thus highly desirable.

Figure 1:
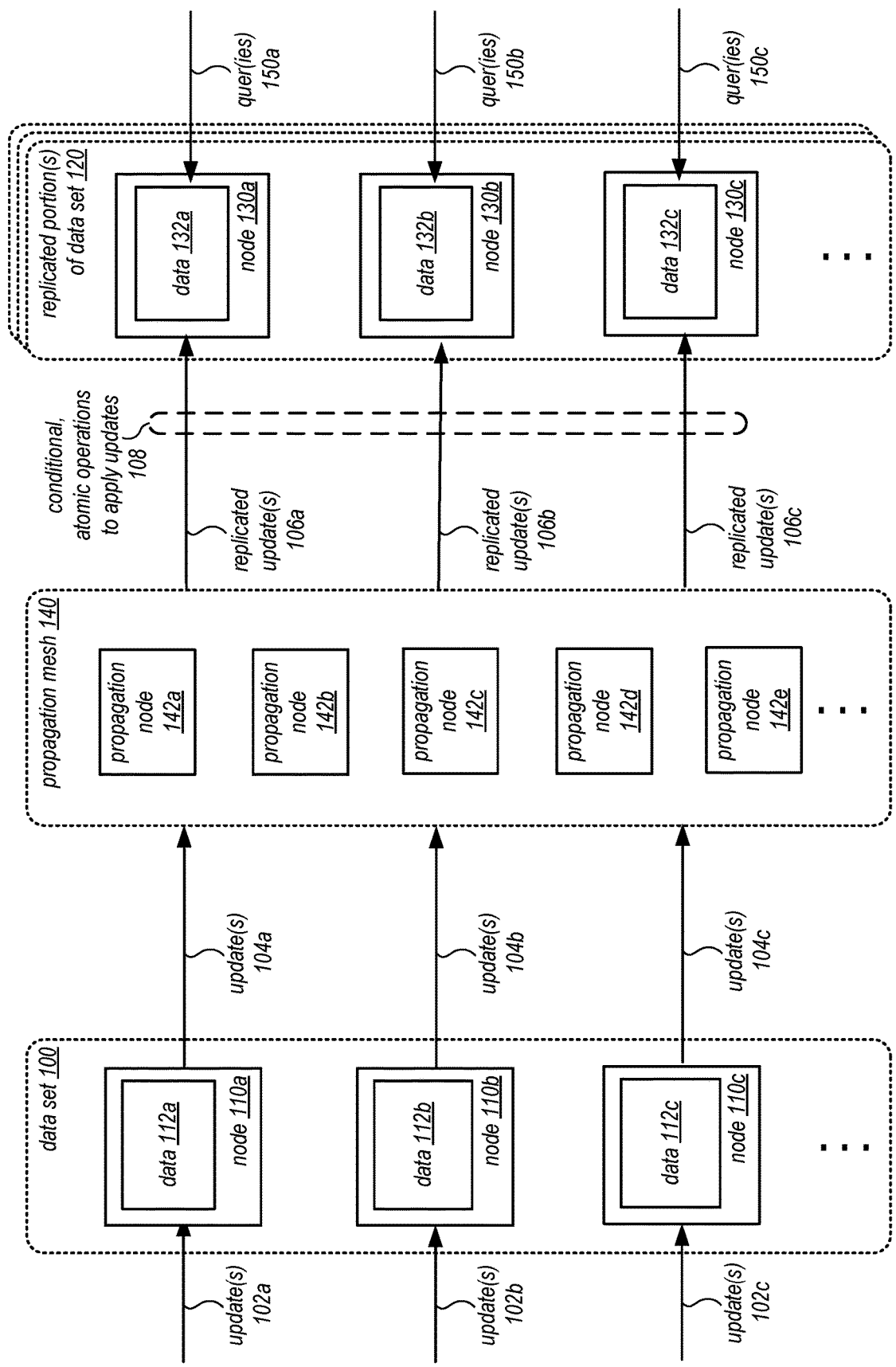
FIG. 1 is a logical block diagram illustrating a scalable architecture for propagating updates to replicated data, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a scalable architecture for propagating updates to replicated data, according to some embodiments. Data sets may be distributed across one or more locations in a storage system, in some embodiments. In this way, clients can access and independently update different portions of the data set at the one or more locations in the storage system, in some embodiments. The arrangement of the data set may be optimal for some access requests (e.g., queries based on indexed fields or values in a table). However, to optimally process other access requests (e.g., queries based on non-indexed fields or values in a table), portions of the data set (or the entire data set) may be replicated in one or more other locations (e.g., a different storage nodes, systems, or hosts) in a different arrangement, subset, or format that is more performant for performing the other type of access request, in some embodiments.

To maintain the replicated portions of the data set to be consistent with the data set, updates made to the data set may need to be replicated to the replicated portions of the data set, in some embodiments. For example, if a replicated portion of a data set maintains a list or view of items in the data set with a common attribute value (e.g., "gender=female"), then an update that adds an item to the data set with the common attribute value may be also propagated to the replicated portion of the data set, in one embodiment. As the number and size of replicated portions of a data set and the data set itself increase, the propagation of updates to replicated data sets may take away from the capacity of nodes, storage systems, or hosts that maintain the data set to both provide access to the data set and propagate updates to replicated portions of the data set, in some embodiments. Instead of burdening the nodes, storage systems or other hosts that maintain the data set with the responsibility for ensuring that updates are appropriately propagated to the correct replicated portions of the data set, a scalable architecture for propagating updates to replicated data may be implemented that independently manages and performs the propagation of updates to the replicated portions of the data set, according to some embodiments.

FIG. 1 is a logical block diagram illustrating a scalable architecture for propagating updates to replicated data, according to some embodiments. Data set 100 may be one or more data structures, objects or other groupings of data distributed amongst multiple locations for storage and access, in some embodiments. For example, as illustrated in FIG. 1, different nodes, such as nodes 110a, 110b, and 110c, may store data that is part of data set 100, such as data 112a, 112b, and 112c respectively, in one embodiment. Data 112 may be partitions or other distributions of data from data set 100, in some embodiments, such as table partitions or other data objects that make up data set 100 that is stored as part of a relational or non-relational (e.g., NoSQL) database. In at least some embodiments, data 112 may be separately replicated amongst multiple nodes (not illustrated) in order to increase the durability and availability of data 112. For example node 110a may be one of multiple nodes storing copies of data 112a, in some embodiments. However, in at least some embodiments, one of the multiple nodes (e.g., node 110a) may be responsible for sending updates to node 130 for separate replication.

Replicated portion(s) of the data set 120 may also be maintained for access, in various embodiments. For example, nodes, such as nodes 130a, 130b, and 130c may respectively store data 132a, 132b, and 132c, which may be a portion of one or more different parts of data set 100, in one embodiment. As discussed below with regard to FIGS. 2-8 and 10-13, data 132 may be a secondary index, projection, or other view of data (or partitions thereof) that represents a subset of data set 100, in one embodiment, which may be stored according to a different format, schema, or other arrangement than data set 100. In at least some embodiments, data 132 may be stored, organized, or made accessible to access, such as quer(ies) 150a, 150b, and 150c differently than data 112 of data set 100. If replicated portion of data set 120 were a secondary index may, for instance, then data 132 may store entries, objects, or other information from data set 100 in a different order on storage devices, in one embodiment.

Nodes, such as nodes 110a, 110b, 110c, 130a, 130b, and 130c may be one or more virtual or physical storage devices, processing devices, servers or other computing systems, such as computing system 2000 discussed below with regard to FIG. 14 that may store data for data set 100 and replicated portion of data set 120, in various embodiments. Nodes may provide access to data objects. For example, as illustrated in FIG. 1, updates, such as updates 102a, 102b, and 102c may be received and processed at nodes 110a, 110b, and 110c respectively and queries, such as quer(ies) 150a, 150b, and 150c, may be received and processed at nodes 130a, 130b, and 130c, in one embodiment. Each node may independently process access requests (e.g., updates or queries), in various embodiments. For example, node 110a may process different updates 102a (e.g., to change a record, object, or entry in data 112a), than node 110c, which may process updates 102c (e.g., to insert or delete a record, object, or entry in data 112c). Updates 102 may be any change, addition, deletion, or other modification of data set 100, in various embodiments.

In at least some embodiments, nodes 130a, 130b, and 130c may provide access to data 132a, 132b, and 132c as part of replicated portion(s) of data set 120. For example, quer(ies) 150 may specify one or more predicates, search criteria, or other indication of desired data that may be applied to data 132 to be returned to a requestor, in one embodiment. A query may be specified according to a particular protocol or language (e.g., Structured Query Language (SQL)) or may be formatted according a programmatic interface (e.g., Application Programming Interface (API)), in one embodiment. In at least some embodiments, quer(ies) 150 may be identified for a consistent view with respect to data set 100 (or may be marked or identified for performance without a consistency guarantee).

Update(s) 102 performed at nodes 110 may be propagated to replicated portion(s) of data set 120, in some embodiments. For example, propagation mesh 140 may implement a scalable architecture including one or more propagation nodes, such as propagation nodes 142a, 142b, 142c, 142d, and 142e, which may receive update(s) committed to data set 110, such as update(s) 104a, 104b, and 104c, from nodes 110, identify or determine which updates need to be replicated (as not all updates may be appropriate for otherwise applicable to replicated portions), and send the identified updates, such as replicated update(s) 106a, 106b, 106c, to the appropriate nodes 130 of replicated portions of data set 120, in some embodiments. Propagation mesh 140 may implement one or more tiers or layers of propagation nodes 142 to collect, evaluate, and apply updates to replicated portion(s) of data set 120, in some embodiments. For example, a first tier of propagation nodes 142 may initially receive the updates 104 from nodes 110, filter out those updates that do not need to be replicated, and send the remaining updates on to another propagation node 142 that may be responsible for updating data 132 in node(s) 130. In this way, nodes 110 need not determine which nodes 130 should receive an update and track whether or not the update has been successfully performed at nodes 130, but instead may forward or otherwise send on all updates, which may prevent the imposition of additional latency into the update path for nodes 110.

In order to prevent exposing the replicated updates at replicated portion of data set 120 out of order, propagation nodes 142 may perform conditional, atomic operations 108 to apply updates 106, in various embodiments, to enforce a logical ordering of updates as they are committed to data 100. A conditional, atomic operation may atomically check a condition included in the request to apply the update and if the condition evaluates true apply the update, in some embodiments. In this way, no changes to an item or part of data 132 being considered for an update 106 may intervene between the evaluation of the condition and the application of the update (if the condition evaluates true). In various embodiments, the condition for replicated updates may include a version identifier for the replicated update 106 (e.g., a sequence number, timestamp, or other identifier that provides a logical ordering for updates to the data set as performed or otherwise committed at nodes 110). A current version identifier for the item or part of data 132 being considered for an update 106 may also be maintained at or accessible to node 130 (e.g., as a field, attribute, or metadata value), in some embodiments. The condition may compare the version identifier of the update with the current version identifier for the item or part of data 132 and evaluate true if the version identifier of the update is later than the current version of the item or part of data 132 (e.g., a newer timestamp value, higher sequence number or other indication that the version identifier of the update occurs after the current version identifier in the logical ordering of updates to the data set), in some embodiments. In this way, the update may only be applied and thus exposed to queries 150 if they move the state of the item or other part of the data 132 forward in the logical ordering of updates to the data set.

Because propagation nodes may fail, lose connections, or otherwise fail to complete replicated update(s) 106 (e.g., due to node 130 failures), conditional atomic operations to apply updates according to version identifiers may prevent replicated update(s) that are replayed or otherwise processed out of order from being applied out of order at data 132, moving the state of an item or other part of data 132 backward in the logical ordering of changes. For example, an update to insert an item that occurs before an update to delete the item in the logical ordering could be potentially replayed (e.g., due to a failure of a propagation node) and thus attempt to re-insert the item which had been deleted, making that deleted item visible at a replicated portion of data set 120. If the condition describing the version identifier is evaluated, however, before applying the update, then only those updates that do not represent a prior state in the logical ordering may be applied, in some embodiments. In at least some embodiments, the current version identifier may be stored as part of data 132 (e.g., as attribute or field value of an item). In such scenarios, deletions of the item could present scenarios where a replay of an early insert may be mistaken as a "new" insert of the item, as there may be no existing version identifier to perform the comparison. Various techniques discussed below with regard to FIGS. 6-8 and 13 may be implemented to ensure that deleted items are not re-inserted into a replicated portion of a data set 120 as a result of an out of order update.

Please note that previous descriptions of implementing a scalable architecture for propagating updates to replicated data are not intended to be limiting, but are merely provided as logical examples. The number of nodes or partitions of data set 100 may be different as may be the number of nodes storing replicated portion of data set 130 or propagation nodes 142, for example.

This specification begins with a general description of a provider network that may implement a database service that may implement secondary indexes that are replicated portions of a database table stored as part of the database service. The database service may implement a scalable architecture for propagating updates to replicated data to propagate updates to the database table at the secondary indexes, in one embodiment. Then various examples of a database service and other services are discussed, including different components/modules, or arrangements of components/module, that may be employed as part of implementing the database service, in one embodiment. A number of different methods and techniques to implement a scalable architecture for propagating updates to replicated data are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
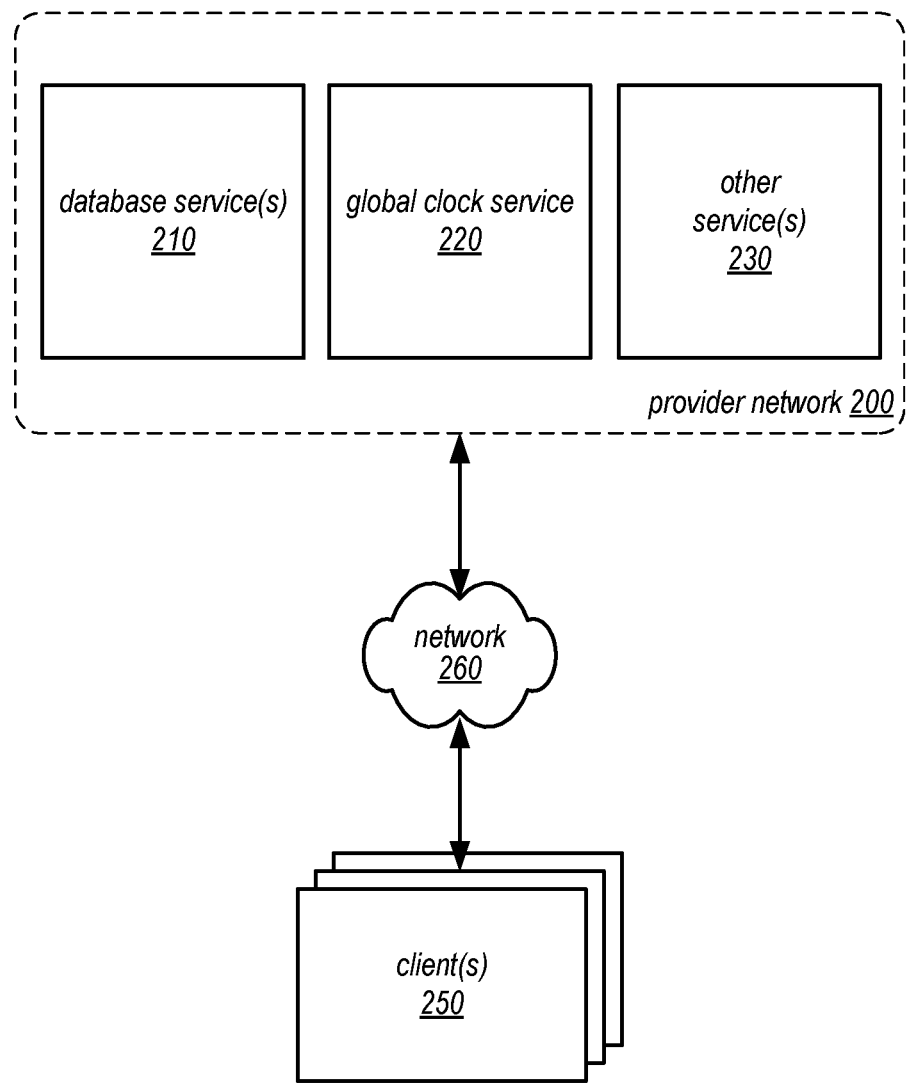
FIG. 2 is a logical block diagram illustrating a provider network that implements a database service and global clock service, according to some embodiments.

FIG. 2 is a logical block diagram illustrating a provider network that implements a database service and global clock service, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and storage services offered by the provider network 200. In one embodiment, provider network 200 may implement various computing resources or services, such as database service(s) 210 (e.g., relational or non-relational (NoSQL) database query engines), or other data processing services as part of other services 230, such as map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated). In at least some embodiments, provider network 200 may implement global clock service 220 to provide global clock values for propagating updates to replicated portions of data, such as secondary indexes, in database service(s) 210 or other services 230.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 14 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in one of data storage services 220. Various other distributed processing architectures and techniques may be implemented by database service(s) 210 (e.g., grid computing, sharding, distributed hashing, etc.) in another embodiment.

In one embodiment, clients 250 may encompass any type of client configurable to submit network-based requests to provider network 200 via network 260, including requests for database service(s) 210 (e.g., to perform a consistent query at a secondary index for a database hosted in database service 210) or data storage service(s) (e.g., a request to create, read, write, obtain, or modify data in data storage service(s), etc.). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture.

In one embodiment, a client 250 may provide access to provider network 200 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and provider network 200. It is noted that in one embodiment, client(s) 250 may communicate with provider network 200 using a private network rather than the public Internet.

Figure 3:
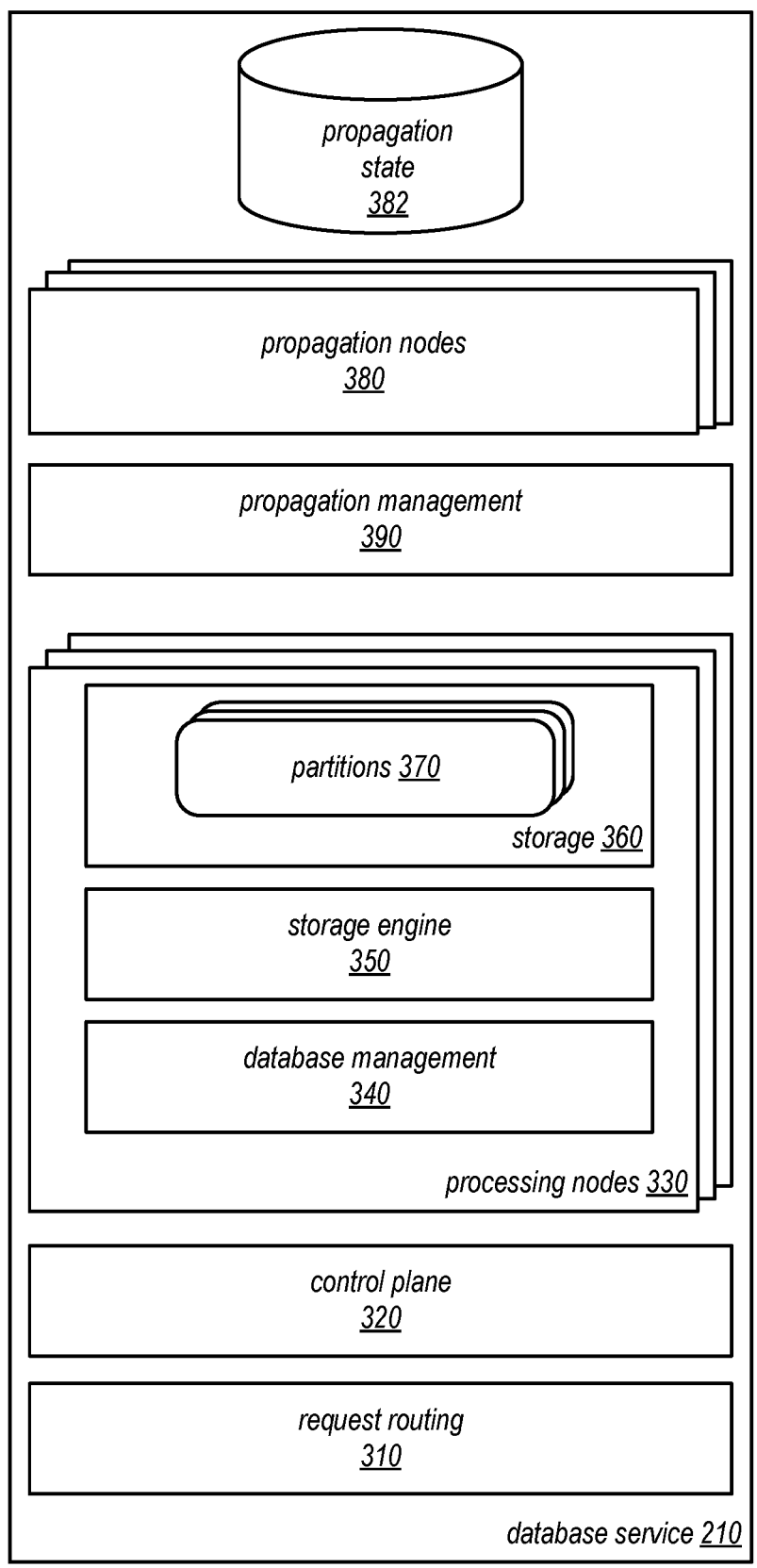
FIG. 3 is a logical block diagram illustrating a database service that may implement a scalable architecture for propagating updates to replicated data, according to some embodiments.

FIG. 3 is a logical block diagram illustrating a database service that may implement a scalable architecture for propagating updates to replicated data, according to some embodiments. Database service 210 may implement request routing 310, in one embodiment. Request routing may 310 receive, authenticate, parse, throttle and/or dispatch service or other access requests, among other things, in one embodiment. In one embodiment, database service 210 may implement control plane 320 to implement one or more administrative components, such as automated admin instances which may provide a variety of visibility and/or control functions). In one embodiment, database service 210 may also implement a plurality of processing nodes 330, each of which may manage one or more partitions 370 of a data set (e.g., a database) on behalf of clients/users or on behalf of the data storage service (and its underlying system) which may be stored in storage (on storage devices attached to processing nodes 330). In at least one embodiment, database service 210 may implement propagation nodes 380 which may propagate or otherwise replicate updates to partition(s) 370 from one processing node 330 to another processing node 330, which may store a replicated portion of a database table (e.g., a global secondary index).

Control plane 320 may provide visibility and control to system administrators, detect split events for processing nodes, and/or anomaly control, resource allocation, in one embodiment. In one embodiment, control plane 320 may also include an admin console, through which system administrators may interact with database service 210 (and/or the underlying system). In one embodiment, the admin console may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 320 may provide an interface or access to information stored about one or more detected control plane events, such as split requests to be processed, at database service 210, in one embodiment.

Control plane 320 may direct the performance of different types of control plane operations among the nodes, systems, or devices implementing database service 210, in one embodiment. For instance, control plane 320 may communicate with processing nodes to initiate the performance of various control plane operations, such as moves, splits, update tables, delete tables, create indexes, etc. . . . . In one embodiment, control plane 320 may update a task registry (or some other table or data structure) with the status, state, or performance information of the control plane operations currently being performed. Control plane 320 may detect, direct, or otherwise instigate different partition movement operations. In at least some embodiments, control plane 320 may direct the creation, allocation, maintenance, and otherwise management of secondary indexes for database tables, such as global secondary indexes.

In one embodiment, request routing 310 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, request routing 310 may perform parsing and/or throttling of service requests, authentication and/or metering of service requests, dispatching service requests, and/or maintaining a partition assignments that map processing nodes to partitions.

Processing nodes 330 may implement database management 340, in one embodiment. Database management 340 may create, update, define, query, and/or otherwise administer databases, in one embodiment. For instance, database management 340 may maintain a database according to a database model (e.g., a relational or non-relational database model). In one embodiment, database management 340 may allow a client to manage data definitions (e.g., Data Definition Language (DDL) requests to describe column definitions, requests to add item attributes, etc.). In one embodiment, database management 340 may handle requests to access the data (e.g., to insert, modify, add, or delete data as well as requests to query for data by generating query execution plans to determine which partitions of a database may need to be evaluated or searched in order to service the query). In one embodiment, database management 340 may also perform other management functions, such as enforcing access controls or permissions, concurrency control, or recovery operations. In one embodiment, database management 340 may send requests to storage engine 350 to access partitions 370 in order to process access requests (e.g., requests to read or scan different partitions or particular items or parts of data within a partition).

Database management 340 may also obtain global clock value mappings, as discussed below with regard to FIG. 7, in order to determine the mapping of local time at the processing nodes 330 to global clock values, in some embodiments. Database management 340 may associate or otherwise identify, access requests, such as queries or updates to a partition based on the local time mapping (e.g., mapping a query or update received with a 10 millisecond local clock interval to a global clock value), in some embodiments. Database management 340 may send messages or other indications of updates to other processing nodes 340 or propagation nodes 380 in order to replicate changes, in some embodiments. The messages may include an indication of the global clock value associated with the updates, in some embodiments.

In one embodiment, processing nodes 330 may implement storage engine 350 to access storage 360 (e.g., internal or external to processing nodes 330) that store partitions 370. Storage engine 350 may perform requests on behalf of database management to create, read, update and delete (CRUD) data in a partition, in one embodiment. Storage engine 350 may implement buffers, caches, or other storage components to reduce the number of times storage is accessed, in one embodiment. Storage engine 350 may implement various storage interfaces to access storage 360. For example, in those embodiments where external storage is a network-based data storage service, like another data storage service in provider network 200 in FIG. 2, then storage engine 350 may establish a network connection with the service as part of obtaining access to a storage unit (e.g., by submit requests formatted according to a protocol or API to establish the connection). In another embodiment, storage engine 350 may access internal storage using storage protocols (e.g., Small Computer Systems Interface (SCSI)) over a bus or other interconnect that directly connects a host implementing storage engine 350 with storage 360).

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in one embodiment, one or more processing nodes 330 process access requests on behalf of clients directed to tables. Some of these processing nodes may operate as if they were in a multi-tenant environment, and others may operate as if they were in a single-tenant environment. In one embodiments, processing nodes 330 that operate as in a multi-tenant environment may be implemented on different processing nodes (or on different virtual machines executing on a single host) than processing nodes that operate as in a single-tenant environment.

In addition to dividing or otherwise distributing data sets across processing nodes 330 in separate partitions, processing nodes 330 may also be used to may be implementing or maintaining resources in multiple different arrangements, some of which may be part of larger collections or groups of resources. A replica group, for example, may be composed of a number of processing nodes maintaining a replica of particular portion of data (e.g., a partition of a table) for the database service 210. Moreover, different replica groups may utilize overlapping nodes, where a processing node 330 may be a member of multiple replica groups, maintaining replicas for each of those groups whose other processing node 330 members differ from the other replica groups. Thus if, for example replica group 1 has processing nodes A, B, and C, replica group 2 may have processing nodes B, D, and E. Besides differing groups of processing nodes, in various embodiments, processing nodes may have different relationships to other processing nodes. Continuing with the above example, for replica group 1, storage node A may be a master node, performing special functions with regard to access requests directed toward the partition maintained by replica group 1. For replica group 2, however, processing node B may be the master node. Therefore, a processing node's relationship to other processing nodes may be different depending on the particular grouping evaluated. These various examples of different arrangements of resources among processing nodes highlight the various different ways that control plane operations may interact with resources that are not solely devoted to one particular (though they may be) function, data replica, etc.

In at least some embodiments, the systems underlying the database service 210 described herein may store data on behalf of storage service clients (e.g., client applications, users, and/or subscribers) in tables containing items that have one or more attributes. In some embodiments, database service 210 may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white" }, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, pre-defined database schemes may be employed, such as the various types of relational databases implemented using Server Query Language (SQL).

In at least some embodiments, database service 210 may implement propagation nodes 380. Propagation nodes 380 may receive indications of updates (or the updated items) from processing nodes 330, in some embodiments. Propagation nodes 380 may obtain (e.g., from control plane 320) mapping information that identifies the secondary index(es) associated with a table, and the format, organization, or other specification that describes the contents of the secondary indexes, including mapping information that maps items stored in a secondary index to respective partitions of the secondary index. Partitions of a secondary index may be stored on a processing node 330 as discussed above, which may provide read-only access to the secondary index. Changes to the secondary index may be received as updates propagated to the secondary index partition(s) at a processing node 330 receive from propagation nodes 380.

Propagation nodes may be selected or assigned responsibility for propagating updates, as discussed below with regard to FIG. 13, in some embodiments. Propagation nodes 380 may access propagation state 382, which may be a data store separate from propagation nodes 380 (e.g., another data store system within database service 210 or implemented as part of another storage service in provider network 200). Propagation state 382 may include various information for tracking the state of operations to propagate updates, as discussed below with regard to FIGS. 6-8 and 13. Propagation management 390 may detect the failure of propagation nodes 380, provision additional propagation nodes 380 or recover the failed propagation nodes 380, in some embodiments. Propagation management 390 may assign propagation responsibility in response to receive requests from processing nodes 330 for a propagation endpoint. In some embodiments, propagation management 390 may assign propagation responsibility for propagation node(s) 380 to propagate updates to secondary index(es) (or partitions thereof), in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate processing nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API) or secondary indexes (e.g., a CreateSecondaryIndex API and/or a DeleteSecondaryIndex API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase provisioned throughput capacity for a given table or create a secondary index for the table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

Database service 210 may include support for some or all of the following operations on data maintained in a table (or index) by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 4:
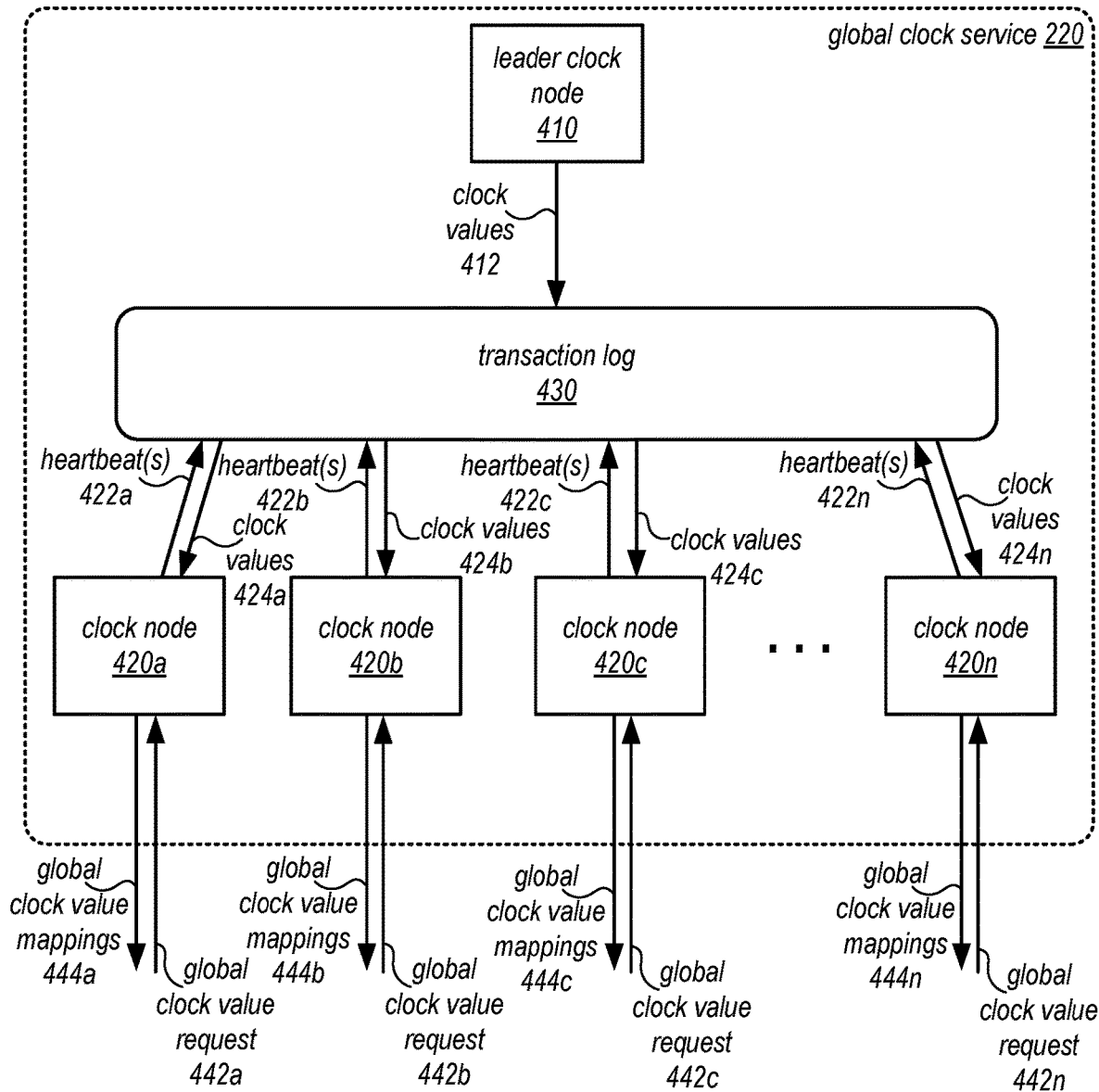
FIG. 4 is a logical block diagram is a global clock service that provides global clock values to clients, according to some embodiments.

FIG. 4 is a logical block diagram is a global clock service that provides global clock values to clients, according to some embodiments. Global clock service 220 may implement a plurality of different clock nodes, such as leader clock node 410 and clock nodes 420a, 420b, 420c, and 420n, to determine and provide global clock value mappings in response to requests.

Clock nodes may elect a leader, such as leader clock node 410 (which may selected according to various leader election schemes). Leader node 410 may, in some embodiments, publish clock values 412 (e.g., multiple times in 1 second) to transaction log 430. Clock nodes 420 may provide heartbeat(s) 422a, 422b, 422c, and 422n respectively to transaction log 430 (e.g., periodically). Based on the clock values (e.g., 424a, 424b, 424c, and 424n) and the heartbeat(s) in transaction log 430, clock nodes 420 can determine stop times for each global clock value in local clock terms, in various embodiments. For example, each clock value 412 published by leader clock node 410 may contain global clock values at 20 millisecond intervals for the next 1 second. Clock nodes 420 can individually determine a clock node's start and end times in leader clock node's local clock time (e.g., Unix times), in various embodiments.

Processing nodes, propagation nodes, or other clients of global clock service 220 can submit requests to clock nodes 420, such as global clock value requests 442a, 442b, 442c, and 442n, in some embodiments. In response, clock nodes 420 may send global clock value mappings, specific to each requesting client (e.g., specific to the requesting processing node or propagation node), such as global clock value mappings 444a, 444b, 444c, and 444n.

Transaction log 430 may provide a fault tolerant, high performance, durable, log storage. Transaction log 430 may be used as a commit log underlying global clock service. Transaction log 430 may provide strong consistency guarantees and support constraints between committed records, to enable features like deduplication, sequencing, and read-write conflict detection. Transactions in transaction log (e.g., proposed clock values 412 and heartbeats 422) may be ordered according to transaction sequence numbers, which may be monotonically increasing to reference the state of the log.

As noted above, database service 210 may, in some embodiments, store data sets as tables of items (which may include one or more data values or attributes) that may be stored, managed and accessed according to a key value pair which uniquely identifies an item in the table. Generally, this may allow for fast throughput to update data in items or store new items. However, in some scenarios, locating items that have particular attributes may be resource intensive, in some embodiments. For instance, identifying items with a particular attribute value that is within a range of values would likely instigate a scan of an entire table even though the range of may be only a small portion of possible values for the particular attribute or the particular attribute may not exist for some items in the table, in one embodiment.

One example of a replicated portion of data may be a secondary index, in some embodiments. Secondary indexes may be created for a table in order to provide an alternative access schema for items in addition to a unique key value pair, in some embodiments. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, in some embodiments. Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

Figure 5:
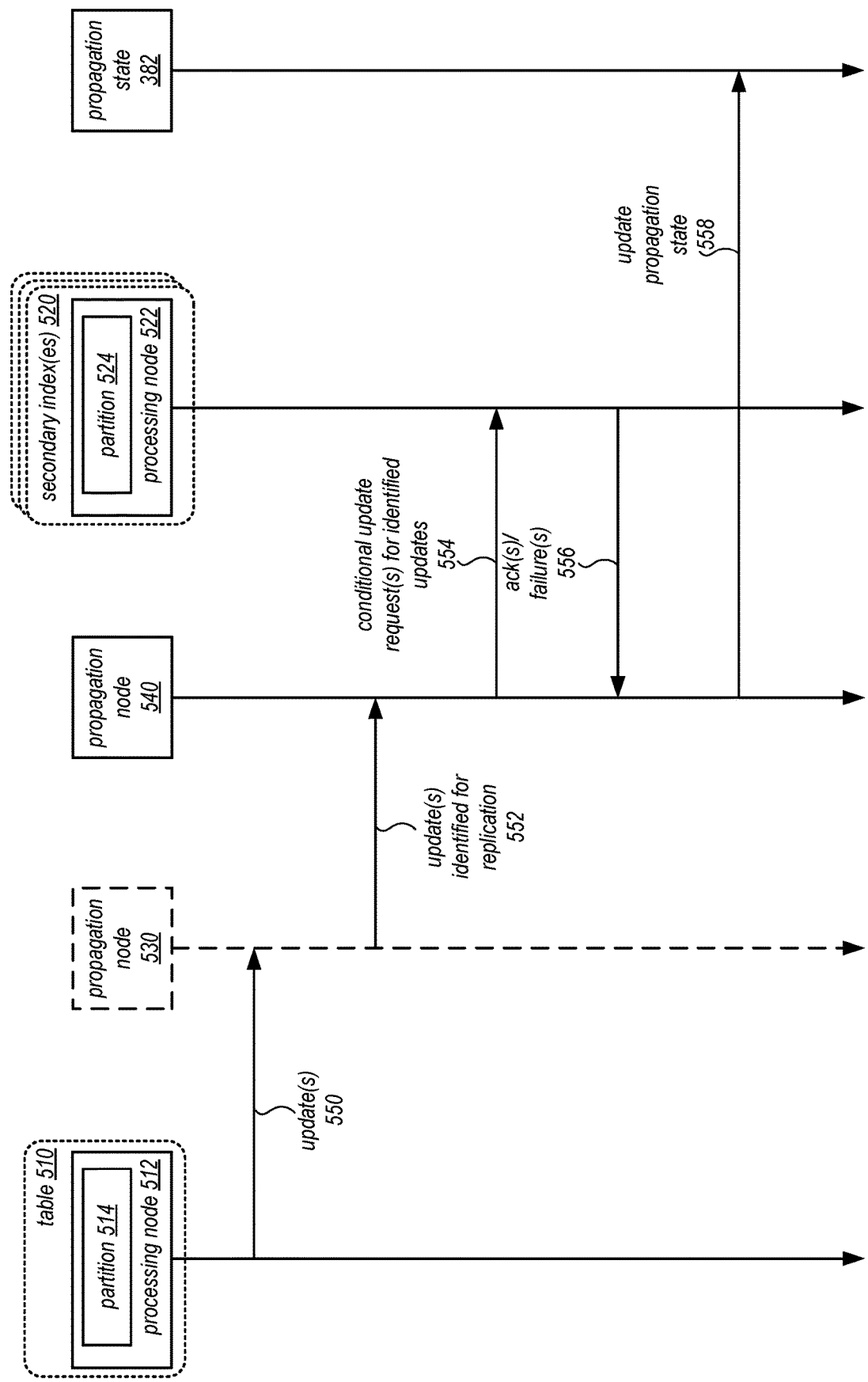
FIG. 5 is a sequence diagram illustrating interactions between propagation nodes and processing nodes to propagate updates, according to some embodiments.

As secondary indexes may be updated according to changes made or performed at several different partitions, the changes of a partition may be propagated to appropriate secondary index(es) via propagation nodes. FIG. 5 is a sequence diagram illustrating interactions between propagation nodes and processing nodes to propagate updates, according to some embodiments. Table 510 may be stored in one or more partitions, such as partition 514, stored at processing node 512 (or in a replica group of processing nodes as discussed above), in one embodiment. Secondary index(es) 520 may be generated as different index(es) of some of the item attributes from table 510 and may be stored in one or more partitions, such as partition 524 at processing node 522 (which may be part of a replica group of processing nodes), in one embodiment. Propagation nodes, such as propagation nodes 530 and 540, may be assigned responsibility to propagate updates from table 510 to secondary index(es) 520, in various embodiments.

Updates that are performed and committed with respect to items in partition 514 in table 510 (e.g., acknowledged to a client that submitted the update as successfully completed and/or otherwise durably persisted to table 510) may sent to propagation node 530. The updates may include the updated version of the item corresponding to the update and a version identifier (e.g., a logical sequence number (LSN), timestamp, or other identifier of a logical ordering of updates to the table In at least some embodiments, all updates may be sent to propagation node 530, without further determination on the part of processing node 512 as to whether the update needs to be propagated in some embodiments. Propagation node 530 may evaluate update(s) 550 to identify those updates that need to be propagated (e.g., make changes to items stored in or to be stored in a secondary index) based on secondary index schema information for secondary index(es) 520 (e.g., describing the arrangement of items in secondary indexes 520). Those updates 550 which are not to be replicated may be dropped, ignored, or other otherwise filtered out of the propagation mesh of propagation nodes. Propagation node 530 may identify propagation node 540 as the propagation node responsible for secondary index(es) 520 (e.g., according to mapping or routing information maintained for propagation nodes to secondary index(es)), in some embodiments, and send the identified updates for replication 552 to propagation node 540.

Propagation node 540 may send one or more conditional update requests 554 to processing node 522 to apply the identified updates to the appropriate items in partition 524 of secondary index(es) 520. The conditional requests 554 may include the updated item and the version identifier as part of a condition that compares the version identifier to the current version identifier for the item in the secondary index. If the item is an insert, then the conditional request may indicate or otherwise specify that if no item exists, then the version comparison may not be performed, in some embodiments. In at least some embodiments, propagation node 540 may track the status of outstanding conditional update requests (e.g., what nodes have been sent a request, what response has been received, etc.). Processing node 522 may send acknowledgements of successful completion of the request or failures 556 to propagation node 540, in some embodiments. Based on the results of the acknowledgments or failures 556, the propagation node 540 may determine whether the update was successful. As discussed below with regard to FIG. 10, in scenarios where the same update needs to be applied to multiple secondary indexes, the update may not be considered successful unless all secondary indexes acknowledge the successful completion of the update. Propagation node 540 may periodically update 558 propagation state 382 with the last committed version identifier of an update that completed successfully across all secondary index(es) 520, in some embodiments, as discussed below. In this way, if another propagation node takes over replication for propagation node 540, propagation state 382 may be accessed to determine the progress of propagation as identified according to the last committed version identifier of an update that completed successfully across all secondary index(es), in some embodiments.

Note that although FIG. 5 illustrates multiple tiers of propagation nodes (nodes 530 and 540) propagating updates, a single tier of propagation nodes may be implemented in one embodiment so that, for instance, propagation node 540 may perform the techniques described above with regard to propagation node 530 in addition to those described for 540. Thus, the previous discussion is not intended to be limiting as to the number of propagation nodes implemented for propagating updates.

Figure 6:
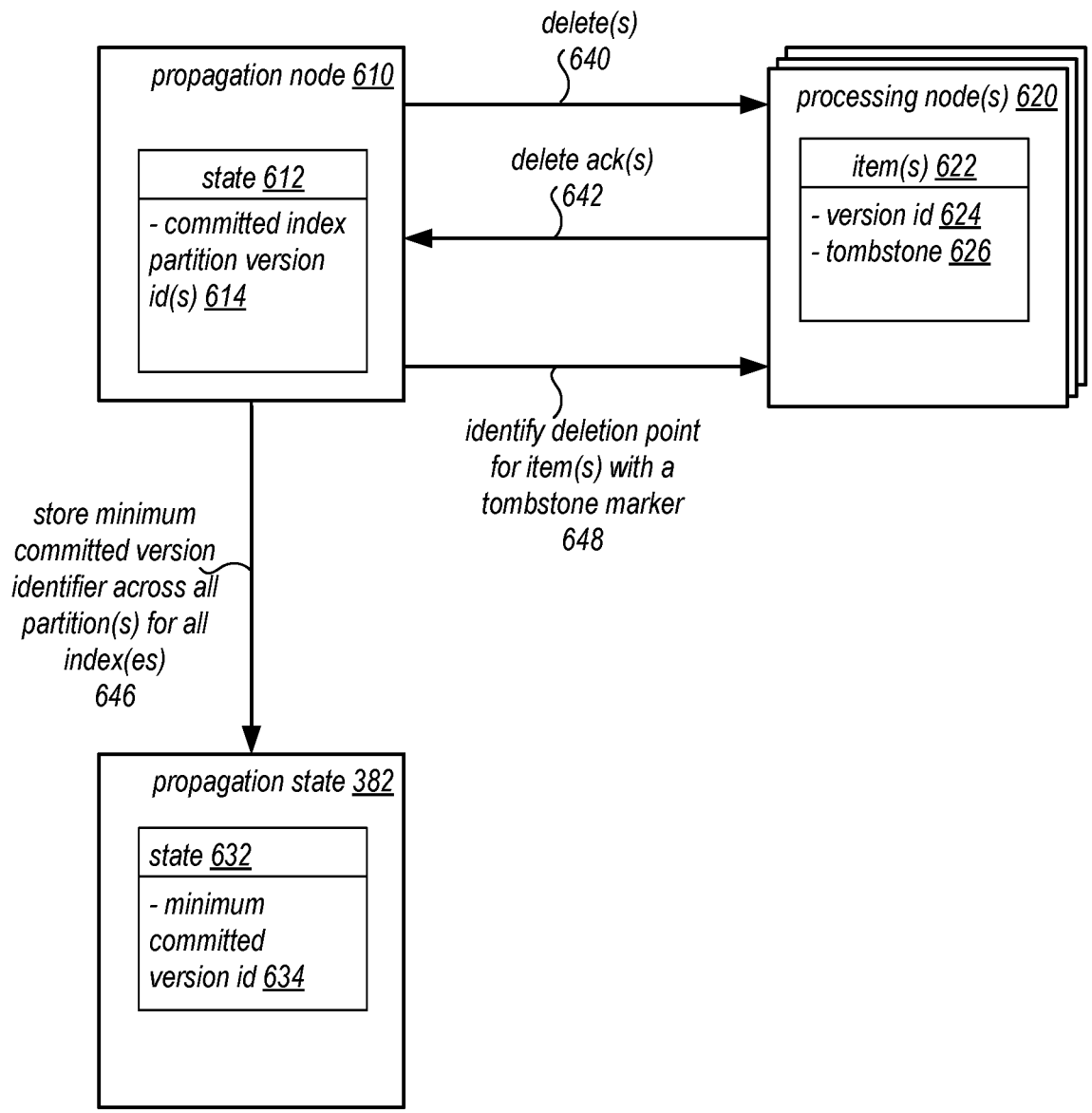
FIG. 6 is logical block diagram illustrating interactions between processing nodes storing a secondary index, a propagation node, and a propagation state that utilize tombstone markers to handle deletions of items at a secondary index, according to some embodiments.

Updates may include or cause the deletion of items from a secondary index (or partition thereof). Deletion requests may, for instance, remove an attribute or item from a database table. Similarly, updates that change a value of an attribute of an item upon which a secondary index is indexed may change the location of the item (e.g., from one partition to another), which would result in the deletion of the item from one partition and the write of the item to another partition of the secondary index. To prevent out of order updates to an item that occur before a deletion from recreating a deleted item at a secondary index, different techniques may be employed. FIG. 6 is logical block diagram illustrating interactions between processing nodes storing a secondary index, a propagation node, and a propagation state that utilize tombstone markers to handle deletions of items at a secondary index, according to some embodiments.

Propagation nodes 610 may send requests to apply updates, including delete(s) 640, to processing node(s) 620 for respective item(s) 622. While a version identifier may be maintained for each item, for deleted item(s) 622, a current version identifier 624 may be maintained along with a tombstone marker 626, which may indicate that the item has been deleted and should not be visible to queries to the processing node(s) 620. Processing node(s) 620 may acknowledge the deletion requests to propagation node 610 (as well as other updates). Propagation node 610 may maintain local state 612 which tracks the committed index partition version identifier(s) 614 for each partition of each secondary index to which the propagation nodes sends updates. For example, the committed index partition version identifier(s) may be the LSN or other version identifier of the latest update for an index partition up to which all prior updates have been applied (e.g., LSN 101,293, indicating that updates with LSNs less than 101,293 have all been committed to the index partition—consistent with the schema of the index). These version(s) 614 may be maintained for each index partition and the minimum committed version identifier across all of the partitions 634 (e.g., the smallest LSN value of 614 for each partition of a secondary index) may be stored 646 as part of state 632 for propagation in propagation state 382.

Propagator node 610 may then send a message to 648 identifying a deletion point for item(s) with a tombstone marker 648. For example, processing node(es) 620 may receive an LSN value as the deletion point and may delete all items with tombstone markers 626 that have version identifiers 624 older (e.g., less than) the deletion point LSN value. As the minimum committed version identifier 634 is saved in propagation state 382, even if propagator node 610 crashes or otherwise fails, a new propagation node that takes over will not send updates older than the deletion point, preventing, for instance, an older update that inserts the item from re-inserting the deleted item.

If a processing node 620 fails and a new processing node (e.g. a new master node) assumes responsibility for the secondary index, then propagation node 610 may resend deletion point 648 to the new processing node so that it can delete items with tombstone markers 626 and older version identifiers 624 which the failed processing node did not complete. In at least some embodiments, processing nodes may maintain items with tombstone markers 626 (or pointers to) in a B-Tree or other data structure for quickly identifying which items have tombstone markers. In some embodiments, if a number of tombstone markers exceeds a threshold amount, then processing node(s) may send an indication to the processing nodes of the database table to throttle updates.

Figure 7:
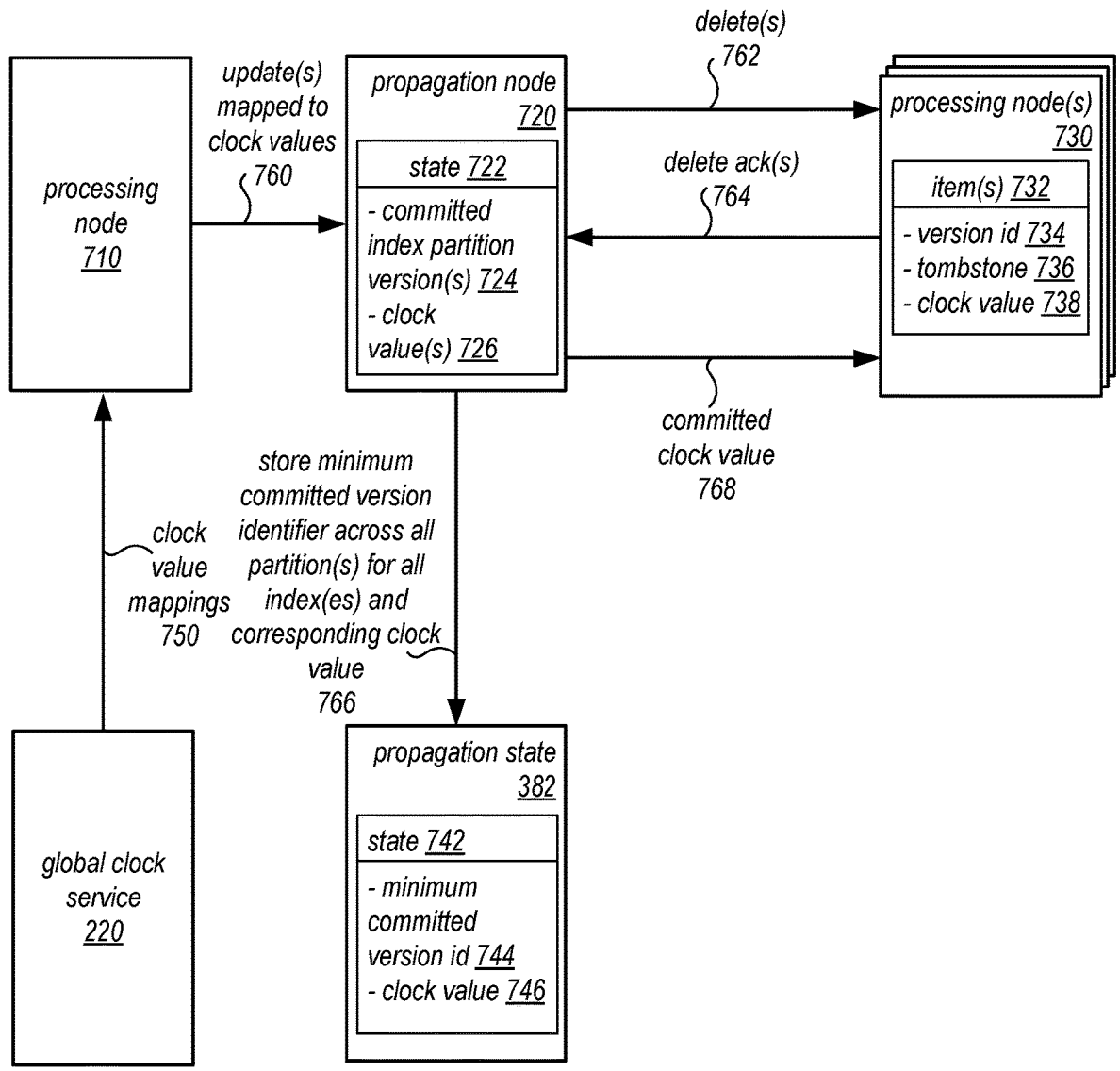
FIG. 7 is logical block diagram illustrating interactions between processing nodes storing a secondary index, a propagation node, and a propagation state that utilize tombstone markers and global clock values to handle deletions of items at a secondary index, according to some embodiments.

FIG. 7 is logical block diagram illustrating interactions between processing nodes storing a secondary index, a propagation node, and a propagation state store, that utilize tombstone markers and global clock values to handle deletions of items at a secondary index, according to some embodiments. Global clock service 220 may provide clock value mappings to a processing node 710. Based on the global clock value mappings 750, processing node 710 may determine global clock values for the updates and provide the updates 760 to propagation node 720 with mapped clock values (along with version identifiers). Propagation node 720 may send requests to apply the updates, including delete(s) 762, to processing node(s) 730 for respective item(s) 732. While a version identifier may be maintained for each item, for deleted item(s) 732, a current version identifier 734 may be maintained along with a tombstone marker 736, which may indicate that the item has been deleted and should not be visible to queries to the processing node(s) 730 and the clock value 738 mapped to the update. Processing node(s) 730 may acknowledge the deletion requests to propagation node 764 (as well as other updates).

Propagation node 720 may maintain local state 722 which tracks the committed index partition version identifier(s) 724 for each partition of each secondary index to which the propagation nodes sends updates. As discussed above with regard to FIG. 6, the committed index partition version identifier(s) may be the LSN or other version identifier of the latest update for an index partition up to which all prior updates have been applied, in some embodiments. These version(s) 724 may be maintained for each index partition. Additionally, a clock value 726 for each partition of each secondary index to which the propagation node 720 sends updates may be maintained. Clock value 726 may be the clock value up to which all prior updates have been applied (e.g., based on acknowledgements from processing node(s) 730. Propagation node 720 may determine the minimum committed version identifier across all of the partitions 744 along with the corresponding clock value 746 to be stored 766 as part of state 742 for propagation in propagation state 382.

Propagation node 720 may send a committed clock value 768 to processing nodes 730, in some embodiments. The committed clock value 768 may indicate that the propagation node 720 has sent all updates for the committed clock value (and has received acknowledgement of successful completion for them as well), in some embodiments. Processing node(s) 730 may compute the minimum clock value from all propagator nodes from which they receive updates and then delete all items with tombstone markers and clock values less than minimum committed clock value 768. If processing node(s) 730 receive an update to insert an item mapped to a clock value less the computed minimum clock value, the update can be identified as out-of-order and ignored or be dropped, in some embodiments. In some embodiments, if a processing node for database table is unavailable (e.g., failed or prevented from communicating due to another type of failure or outage, such as a network partition) or if the processing node for the database table is unable to get clock values, then the calculated minimum clock value might not move forward for a while. To avoid accumulating too many tombstones, an exception list for database tables (or partitions therefore) that have not updated may be saved (which may allow some of those tombstones to be removed).

Figure 8:
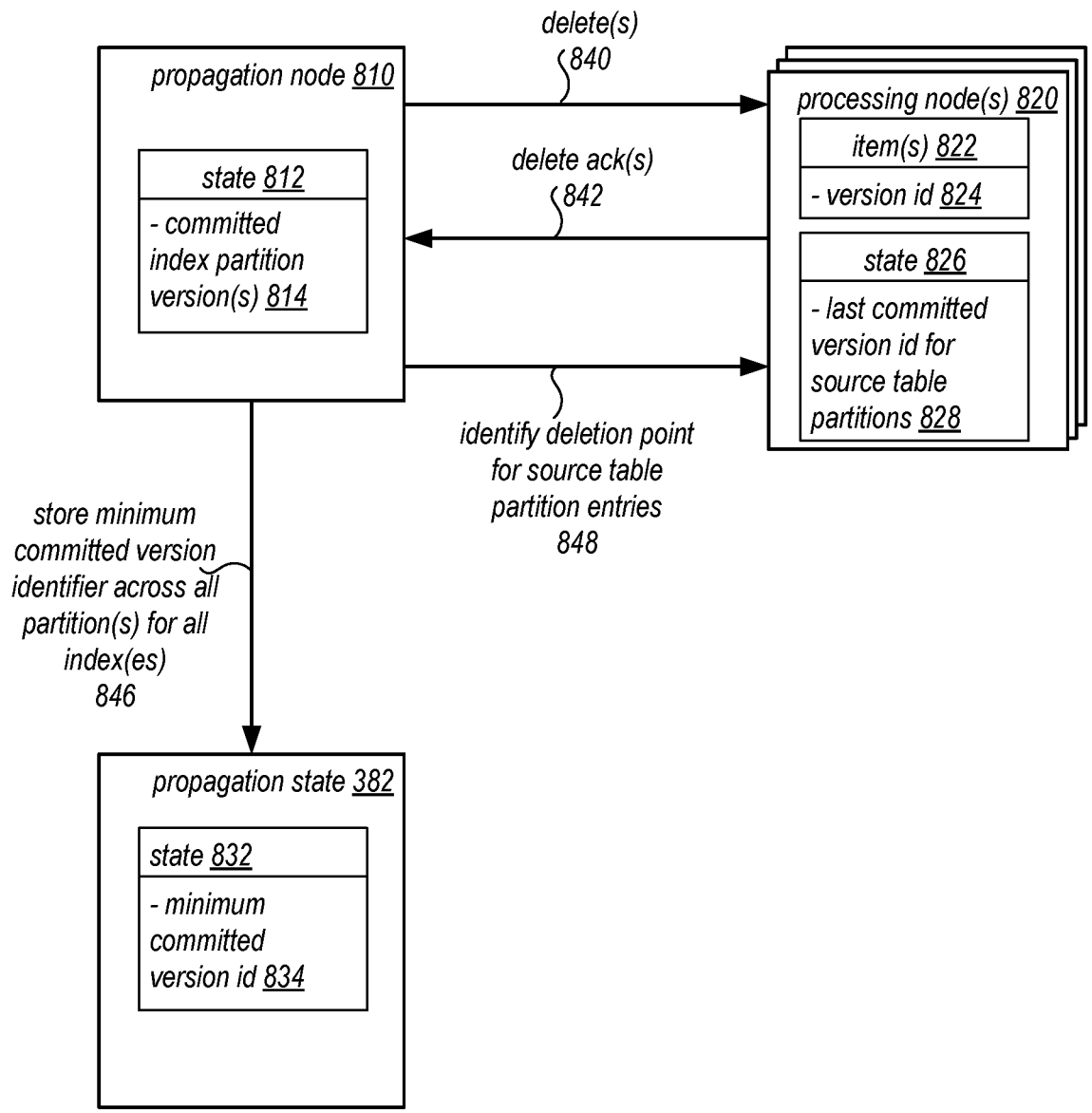
FIG. 8 is logical block diagram illustrating interactions between processing nodes storing a secondary index and a propagation node that utilize partition state mapping to handle deletions of items at a secondary index, according to some embodiments.

FIG. 8 is logical block diagram illustrating interactions between processing nodes storing a secondary index and a propagation node that utilizes partition state mapping to handle deletions of items at a secondary index, according to some embodiments. Propagation node 810 may send requests to apply updates, including delete(s) 840, to processing node(s) 820 for respective item(s) 822. While a version identifier may be maintained for each item, for deleted item(s) 822, a current version identifier 824 may be maintained. State information 826 that maps information for partitions of a database table that are a source of information for the secondary partition may also be maintained. The state information 826 may be updated when delete(s) 840 are received (but not for other updates), in some embodiments, to include a last committed version identifier for the source table partition from which the delete is received. Processing node(s) 820 may acknowledge the deletion requests 842 to propagation node 810 (as well as other updates).

Propagation node 810 may maintain local state 812 which tracks the committed index partition version identifier(s) 814 for each partition of each secondary index to which the propagation nodes sends updates. For example, the committed index partition version identifier(s) may be the LSN or other version identifier of the latest update for an index partition up to which all prior updates have been applied. These version(s) 814 may be maintained for each index partition and the minimum committed version identifier across all of the partitions 834 (e.g., the smallest LSN value of 814 for each partition of a secondary index) may be stored 846 as part of state 832 for propagation in propagation state 382.

Propagator node 810 may then send a message 848 to identifying a deletion point for source table partition entries in state 826. Processing node(s) 820 can delete those entries for partitions from state 826 if the last committed version identifier is less than the deletion point. If processing node(s) 820 receive an update to insert an item from a partition of the database table with a version identifier less than the last committed version identifier 828 for the source table partition in state 826, the update can be identified as out-of-order and ignored or be dropped, in some embodiments.

Note that the techniques described above (and below) with respect to database tables (and partitions thereof) and secondary indexes (and partitions thereof) may be equally applicable to other data sets and replicated portions.

Figure 9:
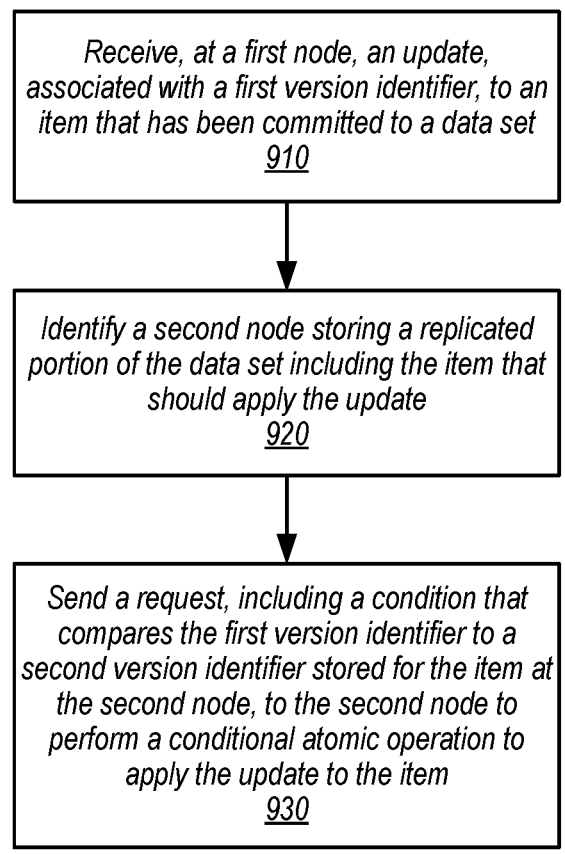
FIG. 9 is a high-level flowchart illustrating various methods and techniques to utilize a scalable architecture for propagating updates to replicated data, according to some embodiments.

The examples of a scalable architecture for propagating updates to replicated data as discussed in FIGS. 2-8 above have been given in regard to a database service (e.g., a non-relational or NoSQL database service or a relational database service). However, various other types of data access, management, or control systems or data processing systems may implement a scalable architecture for propagating updates to replicated data, in other embodiments. FIG. 9 is a high-level flowchart illustrating various methods and techniques to utilize a scalable architecture for propagating updates to replicated data, according to some embodiments. These techniques, as well as the techniques discussed with regard to FIGS. 10-13, may be implemented using components or systems as described above with regard to FIGS. 2-8, as well as other types of databases, storage engines, systems, or clients and thus the following discussion is not intended to be limiting as to the other types of systems that may implement the described techniques.

As indicated at 910, an update to an item that has been committed to a data set may be received at a first node, in various embodiments. For example, the updates may add items, entries, values, attributes or other information, change, modify, or delete items, entries, values, attributes or other information in the data set. The update may be associated with an identifier, such as a timestamp, logical sequence number or other identifier for a logical ordering for updates to the data set (which may be determined by processing nodes, like processing nodes 330 above in FIG. 3, which perform/commit the update to the data set). The update may be received from a node hosting the data set (or partition therefore like processing nodes 330 in FIG. 3) or a propagation node (as discussed above with regard to FIG. 5). In at least some embodiments, the received update may include a version of the item that is updated according to the update (e.g., as opposed to a difference value or other description of the change made to the item which would be dependent upon knowledge of a prior value of the item to be determined).

Figure 10:
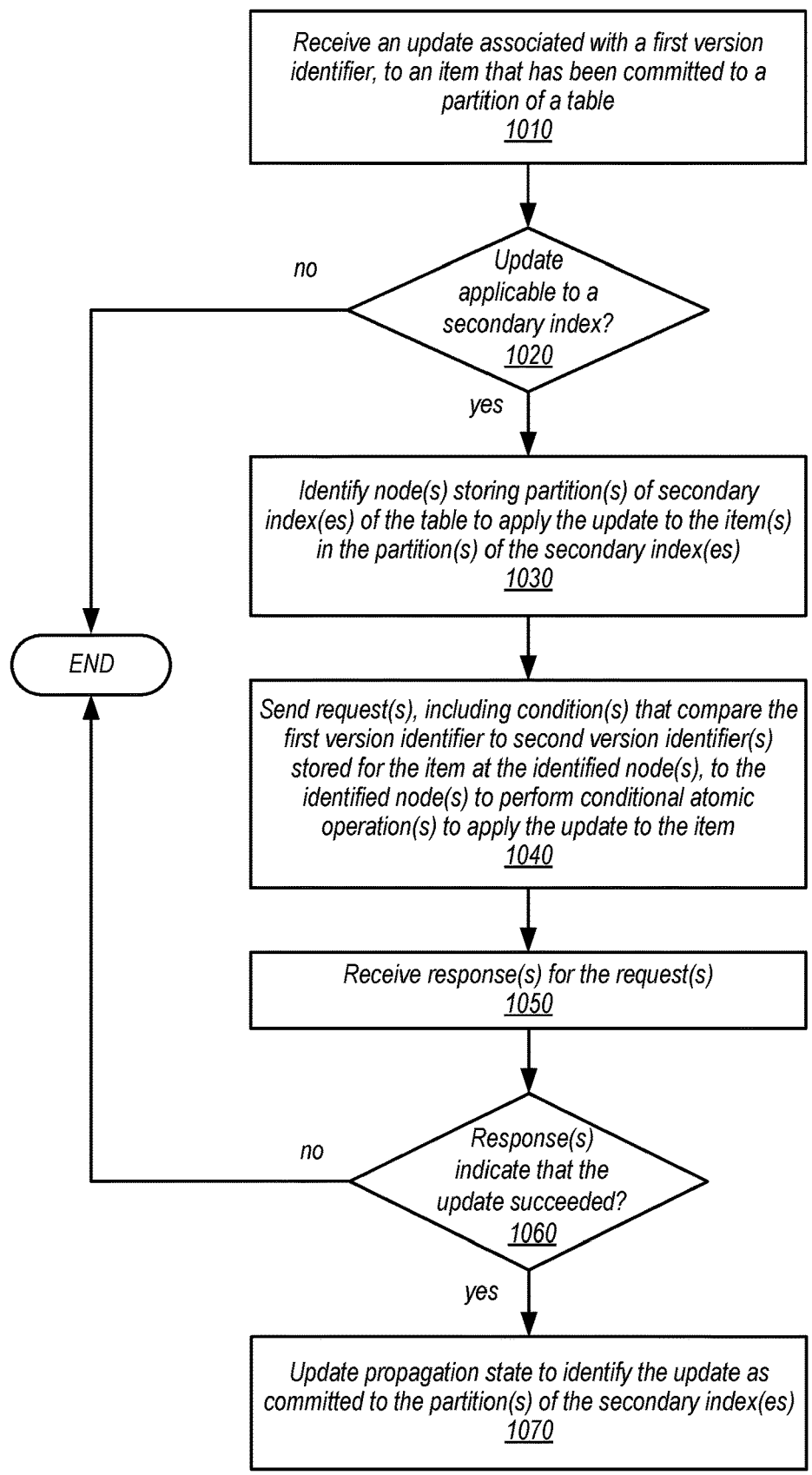
FIG. 10 is a high-level flowchart illustrating various methods and techniques to utilize a scalable architecture for propagating updates to a secondary index from a partition of a database table, according to some embodiments.

As indicated at 920, a second node storing a replicated portion of the data set including the item that should apply the update may be identified, in some embodiments. For example, data formats, schemas, or other mapping information that describes what portions of the data set should be replicated, such as which items and what attributes, values, or portions of the item, as well as to what node (as multiple nodes may host different replicated portions) may be evaluated to identify the second node. FIG. 10, discussed below, provides further examples of techniques for determining whether an update is applicable and thus should be replicated, in some embodiments. In some embodiments, multiple nodes may be identified for receiving the update. For example, if the update is a change to an attribute value for the item that would cause a change in location for the item to another node (e.g., according to a partitioning scheme), then the update may result in two nodes being identified, one for deleting the current item and one for inserting the updated item.

As indicated at 930, a request to perform a conditional atomic operation to apply the update to the item may be sent to the second node. The request may include a condition that compares the version identifier associated with the update to a current version identifier for the item at the second node. For example, as discussed below with regard to FIG. 12, if the version identifier of the update is later than the current version, the update may be performed. In this way, updates that fail to perform are updates that include a version of the item that is "older" than the version of the item in the replicated portion of the data, preventing updates that arrive or are otherwise processed out of order from being made available for querying at the replicated portion of the data set at the second node.

FIG. 10 is a high-level flowchart illustrating various methods and techniques to utilize a scalable architecture for propagating updates to a secondary index from a partition of a database table, according to some embodiments. As indicated at 1010, an update to an item that has been committed to a partition of a table may be received. As discussed above, the updates may add items, entries, values, attributes or other information, change, modify, or delete items, entries, values, attributes or other information in the partition of the table. The update may be associated with an identifier, such as a timestamp, logical sequence number (LSN) or other identifier for a logical ordering for updates to the table. The version identifier may be assigned or mapped to an update by the processing node (e.g., the master node for a replica group of processing nodes) that performed the update. The update may be received from a node hosting the partition (like processing nodes 330 in FIG. 3) or a propagation node (as discussed above with regard to FIG. 5). In at least some embodiments, the received update may include a version of the item that is updated according to the update (as opposed to the difference between versions of the item).

As indicated at 1020, a determination may be made as to whether the update is applicable to a secondary index, in some embodiments. Secondary index schema, for instance, may be evaluated with respect to the update to the item. If the updated item has an attribute, value, or other information included by the secondary index schema to be stored as part of a secondary index, then the update may be applicable, in some embodiments. For example, item A may have multiple attributes (e.g., Attribute AA, BB, CC, DD, EE, FF, and so on). A secondary index may include items where the value of Attribute AA="2017" and may also include the values of Attributes DD and EE. If the updated item has changed the value of AA, DD, or EE, then the update may be applicable (including updates that would result in the removal of an item form the secondary index). Updates not applicable to a secondary index may be dropped, filtered out or otherwise ignored. Secondary index schema evaluations may be performed multiple times for each update as multiple secondary indexes may be maintained for the same database table and the update could be applicable to some of the secondary indexes and not others.

As indicated at 1030, node(s) storing partition(s) of the secondary index(es) of the table to apply the update to the item(s) in the partition(s) of the secondary index(es) may be identified, in some embodiments. Mapping information or a partitioning scheme (e.g., a hashing technique) may identify which nodes host the partitions including respective copies of the item, in some embodiments.

As indicated at 1040, request(s) may be sent to the identified node(s) to perform conditional atomic operations to apply the update to the item may be sent, in various embodiments. As noted above, the request may include a condition that compares the first version identifier associated with the update to respective second version identifier(s) for the item at the identified node(s). For example, as discussed below with regard to FIG. 12, if the version identifier of the update is later than the current version, the update may be performed.

As indicated at 1050, response(s) may be received for the request(s), in some embodiments. The responses may acknowledge the success of the request or a failure (e.g., a condition check failure). Based on the response(s), a determination may be made as to whether the update succeeded, as indicated at 1060. For example, if all identified node(s) acknowledged the update as successful, then the update may be considered to have succeeded. If one or more nodes failed to perform the update, then the update may have not succeeded. As indicated at 1070, propagation state may be updated to identify the update as committed to the partition(s) of the secondary index(es), in some embodiments. The propagation state may be propagation state maintained on propagation nodes and/or in separate propagation store, as discussed above with regard to FIGS. 6-8, in some embodiments.

Figure 11:
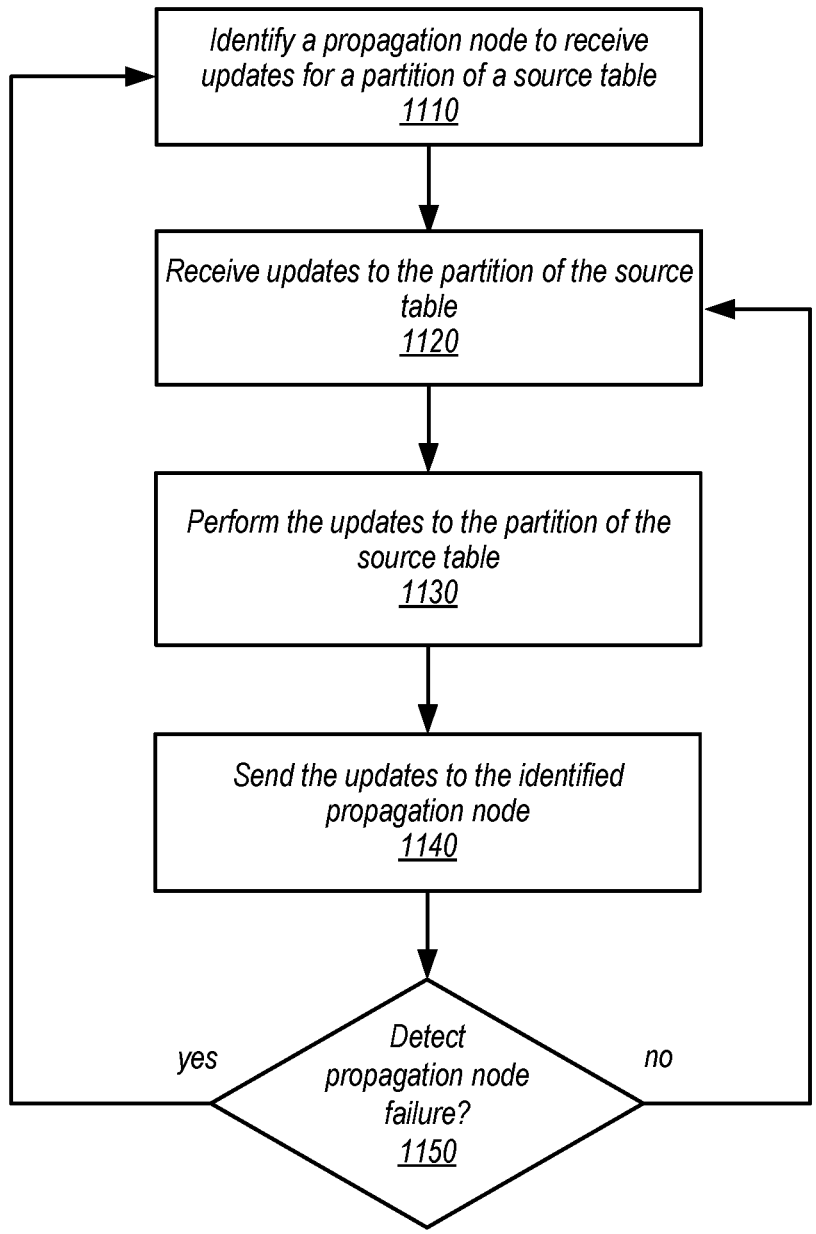
FIG. 11 is a high-level flowchart illustrating various methods and techniques to send updates to propagation nodes, according to some embodiments.

FIG. 11 is a high-level flowchart illustrating various methods and techniques to send updates to propagation nodes, according to some embodiments. As indicated at 1110, a propagation node may be identified to receive updates for a partition of a source table, in some embodiments. For example, mapping information that maps secondary indexes (or other replicated data sets) that replicate from the source table partition to propagation nodes may be evaluated to determine which propagation node receives updates for the source table partition. In some embodiments, such as a multi-tier propagation node architecture, random assignment or other techniques for assigning a first tier node may be performed in order to collect or aggregate requests from one or multiple nodes regardless of whether the nodes store partitions of the same table may be performed as first tier propagation nodes may be capable of handling update requests from any processing node (as first tier propagation nodes can route the update to other propagation nodes that can direct applicable updates to the correct processing hosts for replicated data.

As indicated at 1120, updates to the partition of the source table may be received. As discussed above with regard to FIG. 3, updates may be received from a client of a database table via an API or other interface, describing the changes to be performed as part of the update. As indicated at 1130, the updates to the partition of the source table may be performed, in some embodiments. For example, various commitment, synchronization, or other request processing techniques may be performed to durably perform and store the update to the partition of the database table (e.g., two-phase commit among processing nodes that form a replica group). As indicated at 1140, once performed or otherwise committed to the partition of the source table, updates may be sent to the identified propagation node. For example, a push-based propagation technique may be implemented that periodically (or as they are committed) sends out updates to the propagation node. In some embodiments, the propagation node may send a request for updates and the processing node for the source table partition may send the updates in response to the request according to a pull model.

In at least some embodiments, a failure of the propagation node may be detected, as indicated at 1150. For example, the propagation node may fail to send a heartbeat or other acknowledgement to the source table partition node. In embodiments implementing pull-based updates, the propagation node may fail to request updates within a period of time. Once detected, a new propagation node may be identified, as indicated at 1110, in some embodiments.

Figure 12:
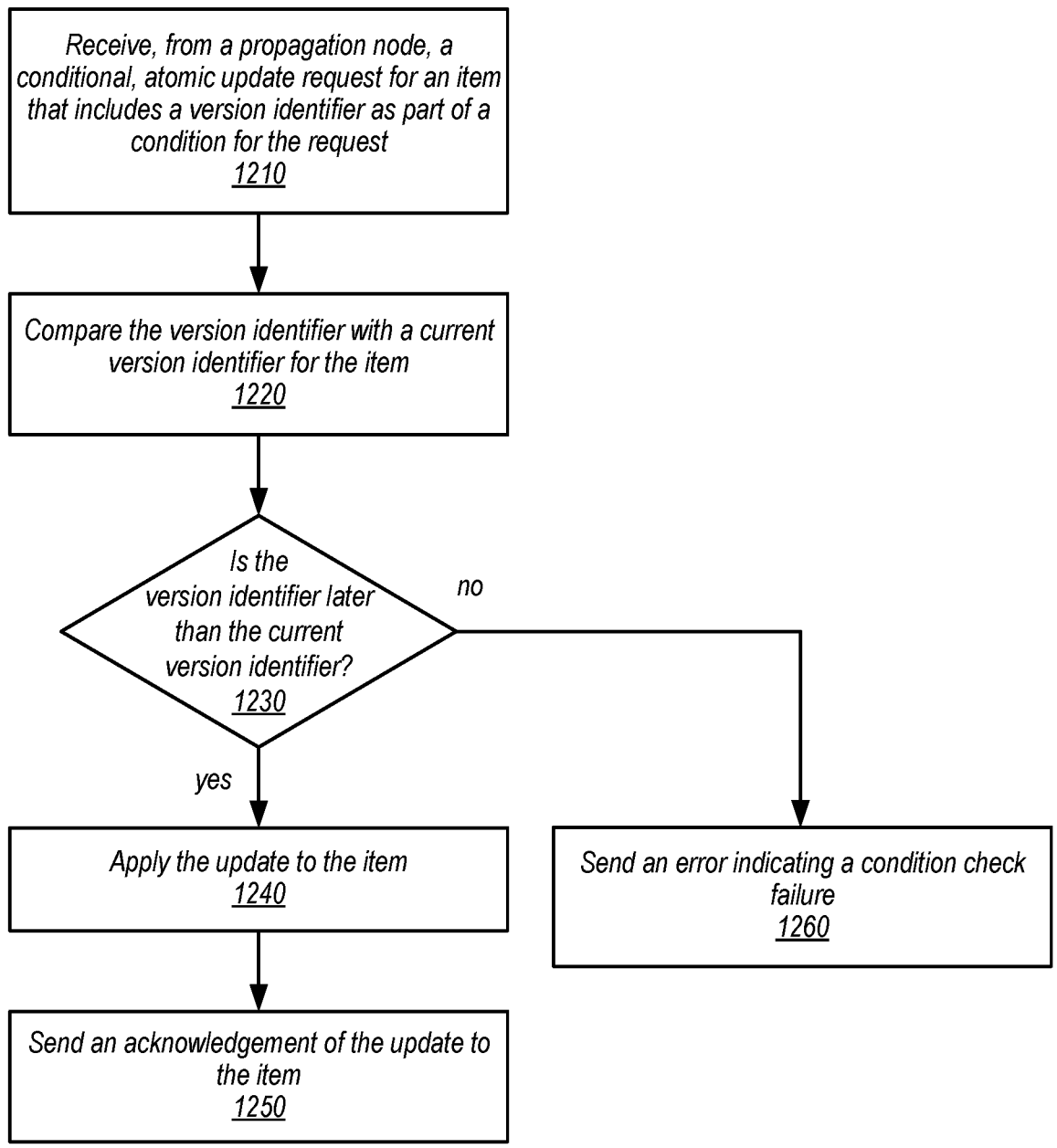
FIG. 12 is a high-level flowchart illustrating various methods and techniques to process a conditional atomic request to apply an update to a replicated portion of a data set, according to some embodiments.

FIG. 12 is a high-level flowchart illustrating various methods and techniques to process a conditional atomic request to apply an update to a replicated portion of a data set, according to some embodiments. As indicated at 1210, a conditional, atomic update request for an item may be received from a propagation node, in some embodiments. The request may be formatted according to an API or other interface format (as discussed above with regard to FIG. 3) which may indicate that the update is conditional, in some embodiments. The condition to evaluate may be included in the request, in some embodiments. For example, comparison operators (<, >, =, !=, etc.) may be used to describe conditions. In at least some embodiments, the condition in the conditional, atomic update request for the item may describe a comparison between the version identifier and a current version identifier for the item.

As indicated at 1220, a comparison of the version identifier of the request and the current version identifier may be performed, in some embodiments. As indicated by the negative exit from 1230, if the version identifier is not later than the current version identifier, then an error indication of a condition check failure may be sent to the propagation node, as indicated at 1260, in some embodiments. As indicated by the positive exit from 1230, if the version identifier is later than the current version identifier, then the update may be applied to the item (e.g., the item may be overwritten with the updated version of the item, the item may be inserted, or the item may be deleted or marked for deletion with a tombstone marker), as indicated at 1240, in some embodiments. An acknowledgment of the update to the item may be sent to the propagation node, as indicated at 1250, in some embodiments.

Figure 13:
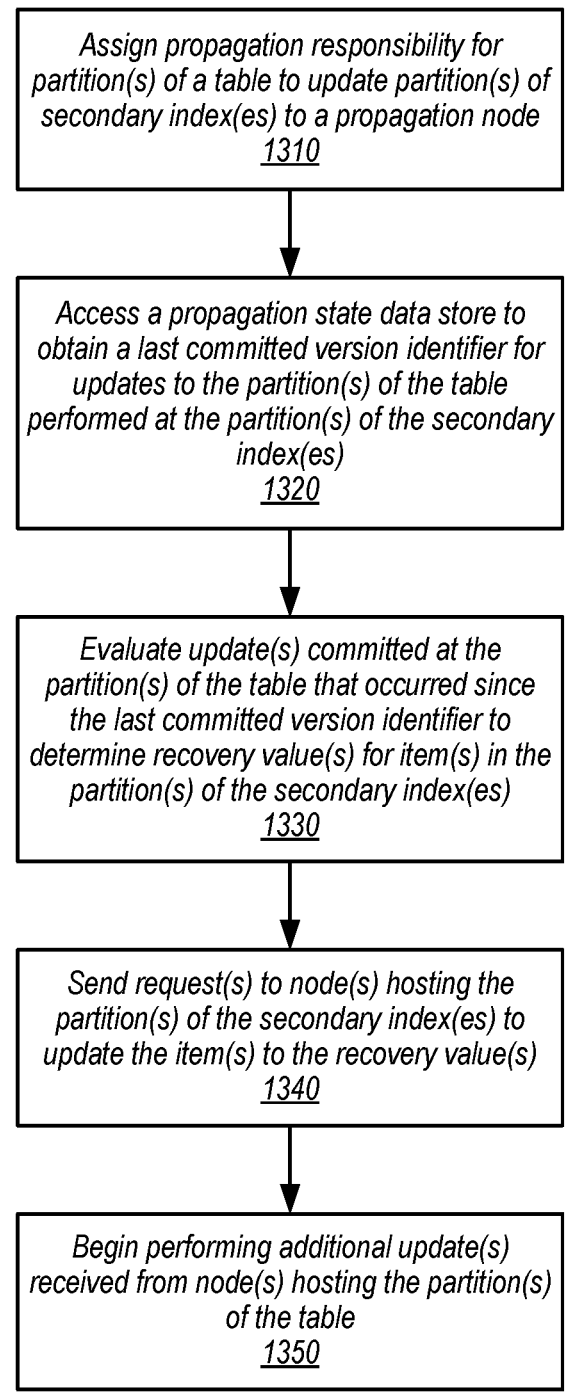
FIG. 13 is a high-level flowchart illustrating various methods and techniques to perform a failover operation to a new propagation node, according to some embodiments.

FIG. 13 is a high-level flowchart illustrating various methods and techniques to perform a failover operation to a new propagation node, according to some embodiments. As indicated at 1310, propagation responsibility for partition(s) of a table to update partition(s) of secondary index(es) may be assigned to a propagation node. For example, a control plane or other management function may track propagation assignments and determine that a failed or underperforming propagation node needs to be replaced. In some embodiments, propagation responsibility may be shifted or reassigned in order to balance propagation workload amongst propagation nodes. A processing node that hosts a data set that is replicated may request or requisition a propagation node, in some embodiments. Similarly, a processing node hosting replicated data may request or requisition a propagation node, in some embodiments.

As indicated at 1320, a propagation state data store may be accessed to obtain a last committed version identifier for updates to the partition(s) of the table performed at the partition(s) of the secondary index(es), in some embodiments. As discussed above with regard to FIGS. 6-8, propagation nodes may track the last committed version identifier(s) for each secondary index (e.g., partition 1=LSN 11,201, partition 2=LSN 15,321, partition 3=LSN 12,704, and so on), which may be the LSN or other version identifier of the latest update for an index partition up to which all prior updates have been applied. The minimum committed version identifier across all of the partitions (e.g., the smallest LSN value out of all of the LSN values maintained for each partition of a secondary index) may be identified and stored in propagation state (e.g., propagation state store 328), which may be separate from the propagation node that identified the minimum committed version identifier. In this way, the minimum committed version identifier survives the failure of the propagation node that determined it. This minimum committed version identifier may be the obtained last committed version identifier, in various embodiments.

As indicated at 1330, update(s) committed at the partitions of the table that have occurred since the last committed version identifier may be evaluated to determine recovery value(s) for item(s) in the partitions of the secondary index, in some embodiments. If, for instance, the last committed version identifier has an LSN value of 22,933, then updates that have been committed to the source data set (e.g., partition(s) of a database table) with greater LSN values (e.g., >22,933) may be evaluated. The update(s) may be obtained from processing nodes hosting the source partitions or other locations or data stores that log committed updates to the table partitions, in some embodiments. The recovery value(s) may be determined by searching the updates for the latest value of items in the committed updates (including deletions of items), in some embodiments. For example, as noted above updates may include a version of the item to which the update is directed, so locating the latest value may include finding the last update directed to an item. In this way, there need not be a replay of the entire set of updates to an item to determine the item's value, as the updates do not merely describe differences or changes made by an update. For instance, updates to item A may be described as "LSN 11315 item A=12, LSN 11942 item A=15, LSN 12001 item A=22," so that the last update to item A is found at LSN 120001. The value of item A, "22," does not have to be calculated, whereas updates describing differences would have to be calculated dependent on prior values (LSN 11315 item A=12, LSN 11942 item A=+3, LSN 12001 item A=+7). The recovery values may be sent as part of requests to the node(s) hosting the partition(s) of the secondary index(es) to update the item(s) to the recovery value(s), as indicated at 1340. In some embodiments, the same techniques for conditional, atomic operations may be applied, as discussed above with regard to FIGS. 9 and 10, to update the items with recovery values. Then, the propagation node may begin performing additional update(s) committed to the partition(s) of the database table received from node(s) hosting the partition(s) of the table, in various embodiments, as indicated at 1350.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments to implement a scalable architecture for propagating updates to replicated data as described herein may be executed on one or more computer systems, which may interact with various other devices. One such computer system is illustrated by FIG. 14. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

Figure 14:
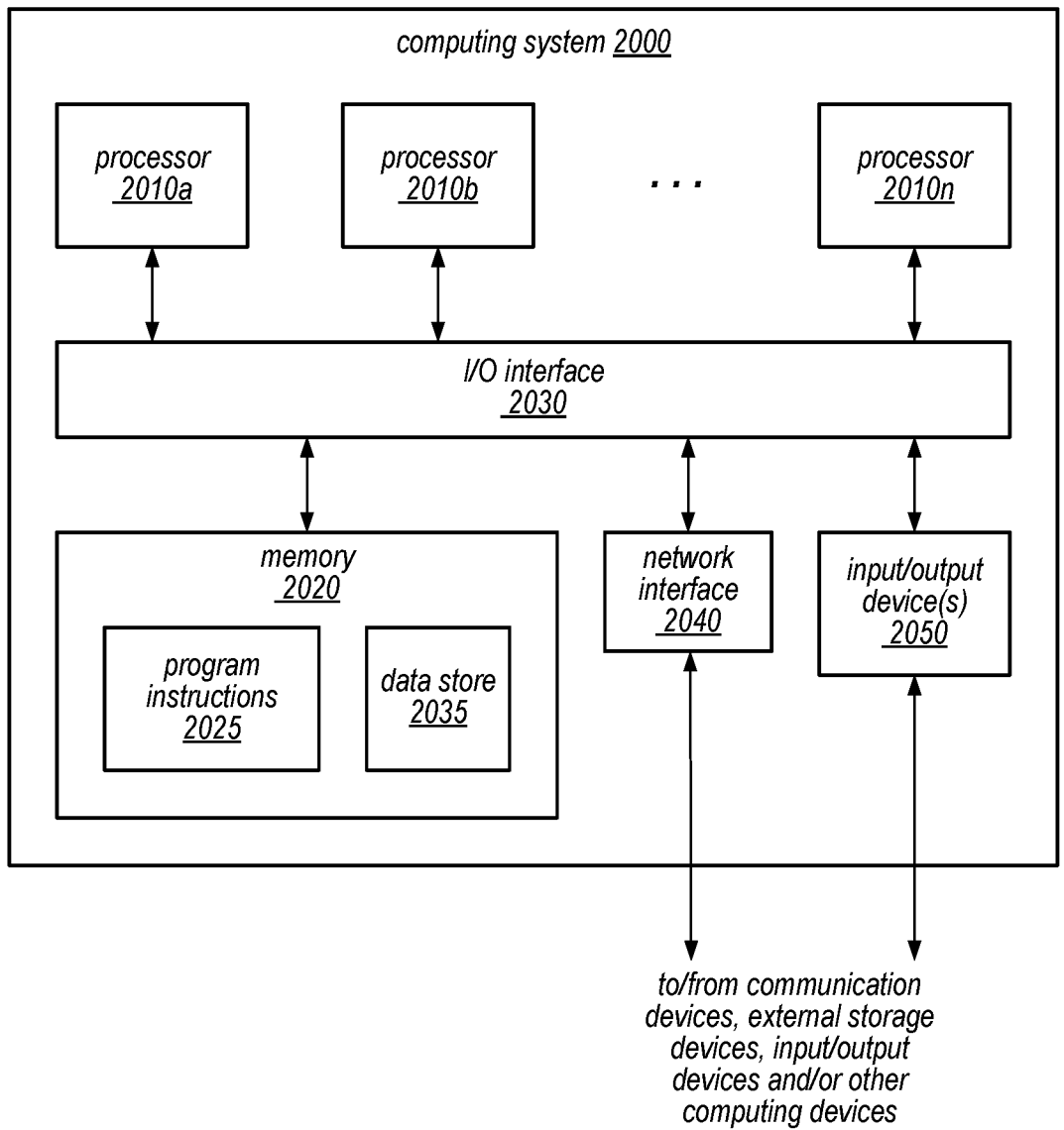
FIG. 14 is a block diagram illustrating an example computing system, according to some embodiments.

As shown in FIG. 14, memory 2020 may include program instructions 2025, that implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a memory to store program instructions which, if performed by at least one processor, cause the at least one processor to perform a method to at least:
    receive, at a propagation mesh comprising a first tier of nodes and a second tier of nodes, one or more updates committed to a data set including an update to an item of the data set, wherein the one or more updates, including the update to the item, have been committed to the data set stored separate from the first tier of nodes,
    wherein the update to the item is associated with a first version identifier,
    wherein the first tier of nodes, including a first node of the first tier of nodes, is assigned to:
        identify, of the received updates, applicable ones of the one or more updates to be propagated for application to respective replicated portions of the data set;
        and identify a particular node of the second tier of nodes, the second tier of nodes assigned to propagate applicable ones of the updates;
        route applicable ones of the updates to the particular node of the second tier of nodes that are assigned to propagate updates, wherein the particular node is identified from the second tier of nodes as assigned to propagate the update to the item;
    determine, by the first node of the first tier that the update to the item should be applied to a respective replicated portion of the data set, the replicated portion including a replica of the item and stored at a respective storage node;
    in response to the determination by the first node of the first tier that the update to the item should be applied to the replicated portion of the data set:
        send, by the particular node of the second tier, a request to the respective storage node to perform a conditional atomic operation to apply the update to the item, wherein the request includes a condition that compares, by the respective storage node, the first version identifier to a second version identifier stored for the item at the respective storage node; and
    in response to an indication of satisfaction of the condition determined by the respective storage node, the indication received from the respective storage node at the particular node of the second tier, update, by the particular node of the second tier, a propagation state to identify the update as committed to the replicated portion of the data set.

2. The system of claim 1, wherein the method further includes:
receive, at the first node, another update to another item that has been committed to the data set;
determine that the other update to the other item should not be applied to the replicated portion of the data set; and
in response to the determination that the other update to the other item should not be applied to the replicated portion of the data set, ignore the other update.

3. The system of claim 1, and wherein the method further comprises:
receiving, at a processing node for the data set, the update to the item;
performing, by the processing node, the update to commit the update to the data set;
identifying, by the processing node, the first node as a propagation node assigned to propagate the update to the data set; and
sending, from the processing node, the update to the propagation node.

4. The system of claim 1, wherein the data set is a table maintained as part of a non-relational database service, wherein the replicated portion of a data set is a secondary index for the table, and wherein the request to perform the conditional atomic operation to apply the update to the item is formatted according to an application programming interface (API) for conditional atomic operations implemented by the non-relational database service.

5. A method, comprising:
receiving, at a propagation mesh comprising a first tier of nodes and a second tier of nodes, an update to an item that has been committed to a data set, wherein the data set is stored separate from the first tier of nodes and separate from the second tier of nodes, wherein the update is associated with a first version identifier,
receiving, at a particular node of the second tier of nodes from a node of the first tier of nodes, the update to the item, wherein the particular node is identified by the node of the first tier of nodes that receives updates committed to the data set, including the update to the item, and routes applicable ones of the updates to the second tier of nodes that propagate updates, wherein the particular node within the second tier of nodes is assigned to propagate the update to the item;
identifying, by the node of the first tier of nodes, a storage node storing a replicated portion of the data set including the item that should apply the update; and
sending, by the particular node of the second tier of nodes, a request to the storage node to perform a conditional atomic operation to apply the update to the item, wherein the request includes a condition that compares, by the storage node, the first version identifier to a second version identifier stored for the item at the storage third node.

6. The method of claim 5, further comprising:
receiving, at the node of the first tier of nodes, another update to another item that has been committed to the data set;
evaluating a schema for the replicated portion of the data set to determine that the other update to the other item should not be applied to the replicated portion of the data set; and
in response to the determination that the other update to the other item should not be applied to the replicated portion of the data set, ignoring the other update.

7. The method of claim 5, further comprising:
determining that the update is committed to the replicated portion of the data set based, at least in part, on a response to the request received from the storage node at the particular node of the second tier of nodes; and
updating a propagation state to identify the update as committed to the replicated portion of the data set.

8. The method of claim 7, wherein the update to the propagation state identifies the committed update as a last committed version identifier for the replicated portion, and wherein the method further comprises:
accessing, by a another node, the propagation state to obtain the last committed version identifier for the replicated portion;
evaluating, by the other node, one or more updates committed to the data set that occurred since the last committed version identifier to determine a recovery value for another item in the replicated portion of the data set; and
sending, by the other node, a request to the storage node to update the other item in the replicated portion of the data set to the recovery value.

9. The method of claim 5, and wherein the method further comprises:
receiving, at a processing node for the data set, the update to the item;
performing, by the processing node, the update to commit the update to the data set.

10. The method of claim 5, wherein the update is mapped to a clock value, wherein the update to the item is a request to delete the item, wherein the application of the update stores a tombstone marker as part of the item and the clock value for the item, and wherein the method further comprises:
sending, by the particular node of the second tier of nodes, a committed clock value for the replicated portion to the storage node; and
based, at least in part, on a comparison of the clock value for the item with the committed clock value for the replicated portion, deleting, by the storage node, the item from the replicated portion of the data set.

11. The method of claim 5, wherein the replicated portion of the data set is stored according to a partitioning scheme for storing replicated portions of the data set amongst multiple other nodes including the storage node, wherein the update modifies an attribute of the item that results in a change in location for the item according to the partitioning scheme, and wherein the method further comprises:
identifying a node of the other nodes to store an updated version of the item;
sending a request to insert the item as part of the replicated portion at the node of the other nodes;
wherein the requested conditional atomic operation to apply the update to the item is a request to delete the item from the replicated portion at the storage node.

12. The method of claim 5, wherein the node of the first tier evaluates a schema for the replicated portion of the data set to determine that the update to the item should be applied to the replicated portion of the data set and wherein responsive to determining that the update to the item should be applied to the replicated portion of the data set, the node of the first tier sends the update to the particular node of the second tier.

13. The method of claim 5, wherein the data set is a database table and wherein the replicated portion of a data set is a secondary index for the table.

14. One or more non-transitory, computer-readable storage media, storing program instructions that when executed on or across one or more processors cause the one or more processors to implement:
   receiving, at a propagation mesh comprising a first tier of nodes and a second tier of nodes, an update to an item that has been committed to a data set, wherein the data set is stored separate from the first tier of nodes and separate from the second tier of nodes, wherein the update is associated with a first version identifier;
   receiving, from a node of the first tier of nodes at a particular node of the second tier of nodes assigned to propagate updates, the update to the item, wherein the node of the first tier of nodes is assigned to route applicable ones of the updates to the second tier of nodes that propagate updates, wherein the particular node of the second tier of nodes is assigned to propagate the update to the item;
   determining that the update to the item should be applied to a replicated portion of the data set including the item;
   in response to determining that the update to the item should be applied to the replicated portion of the data set:
      identifying a storage node storing the replicated portion of the data set; and
      sending a request to the storage node to perform a conditional atomic operation to apply the update to the item, wherein the request includes a condition that compares, by the storage node, the first version identifier to a second version identifier stored for the item at the storage node.

15. The one or more non-transitory, computer-readable storage media of claim 14, further comprising program instructions that cause the one or more processors to further implement:
   determining that the update is committed to the replicated portion of the data set based, at least in part, on a response to the request received from the third storage node at the particular node; and
   updating a propagation state to identify the update as committed to the replicated portion of the data set.

16. The one or more non-transitory, computer-readable storage media of claim 15, wherein the update to the propagation state identifies the committed update as a last committed version identifier for the replicated portion, wherein the update to the item is a request to delete the item, wherein the application of the update stores a tombstone marker as part of the item and the version identifier of the update as the version identifier for the item, and further comprising program instructions that cause the one or more processors to further implement:
   sending, by the particular node of the second tier of nodes to the storage node, a deletion point for the replicated portion determined based, at least in part, on the last committed version identifier for the replicated portion; and
   based, at least in part, on a comparison of the version identifier for the item with the deletion point for the replicated portion, deleting, by the storage node, the item from the replicated portion of the data set.

17. The one or more non-transitory, computer-readable storage media of claim 14, wherein the update to the item is a request to delete the item, wherein the application of the update stores an entry for the data set identifying a last committed version identifier for updates from the data set as part of propagation state maintained at the second node and further comprising program instructions that cause the one or more processors to further implement:
   ignoring one or more additional updates received from the particular node at the storage node based, at least in part, on a comparison between the last committed version identifier for updates from the data set and respective version identifiers for the one or more additional updates.

18. The one or more non-transitory, computer-readable storage media of claim 14, wherein the update is mapped to a clock value, wherein the update to the item is a request to delete the item, wherein the application of the update stores a tombstone marker as part of the item and the clock value for the item, and further comprising program instructions that cause the one or more-processors to further implement:
   sending, by the particular node of the second tier of nodes, a committed clock value for the replicated portion to the storage node; and
   based, at least in part, on a comparison of the clock value for the item with the committed clock value for the replicated portion, deleting, by the storage node, the item from the replicated portion of the data set.

19. The one or more non-transitory, computer-readable storage media of claim 14, further comprising program instructions that cause the one or more computing devices to further implement:
   receiving, at the particular node of the second tier of nodes, another update to another item that has been committed to the data set;
   determining that the other update to the other item should not be applied to the replicated portion of the data set; and
   in response to determining that the other update to the other item should not be applied to the replicated portion of the data set, ignoring the other update.

20. The one or more non-transitory, computer-readable storage media of claim 14, wherein the data set is a table maintained as part of a database service, wherein the replicated portion of a data set is a secondary index for the table, and wherein the request to perform the conditional atomic operation to apply the update to the item is formatted according to an application programming interface (API) for conditional atomic operations implemented by the database service.

* * * * *